(12) United States Patent  (10) Patent No.: US 7,934,740 B2
Wilmot et al.  (45) Date of Patent: May 3, 2011

(54) OFF-ROAD WHEELCHAIR DEVICE WITH SUSPENSION

(76) Inventors: John Wilmot, Milton Freewater, OR (US); Marty Meissner, Milton Freewater, OR (US)

( * ) Notice: Subject to any disclaimer, the term of this patent is extended or adjusted under 35 U.S.C. 154(b) by 144 days.

(21) Appl. No.: 12/262,117

(22) Filed: Oct. 30, 2008

(65) Prior Publication Data

US 2010/0109283 A1  May 6, 2010

(51) Int. Cl.
*A61G 5/10* (2006.01)
(52) U.S. Cl. .................................. 280/304.1; 280/250.1
(58) Field of Classification Search ............... 280/304.1, 280/304.2, 250.1, 288.4
See application file for complete search history.

(56) References Cited

U.S. PATENT DOCUMENTS

| | | | | |
|---|---|---|---|---|
| 6,131,679 | A * | 10/2000 | Pulver et al. ................. | 180/65.1 |
| 6,530,598 | B1 * | 3/2003 | Kirby ............................. | 280/755 |
| 7,694,990 | B2 * | 4/2010 | Goertzen et al. ........... | 280/304.1 |
| 2004/0004342 | A1 * | 1/2004 | Mulhern et al. ........... | 280/304.1 |
| 2004/0046358 | A1 * | 3/2004 | White et al. ................ | 280/304.1 |
| 2005/0206124 | A1 * | 9/2005 | Levi et al. .................. | 280/304.1 |
| 2006/0097478 | A1 * | 5/2006 | Goertzen et al. ........... | 280/304.1 |
| 2006/0244249 | A1 * | 11/2006 | Goertzen et al. ............. | 280/755 |
| 2010/0117328 | A1 * | 5/2010 | Johnson et al. ............ | 280/250.1 |

* cited by examiner

*Primary Examiner* — Lesley Morris
*Assistant Examiner* — Tashiana Adams

(57) ABSTRACT

An improved off-road wheelchair having detachable wheelchair wheels having disc brakes, an anti-wheelie wheel and at least one detachable stability wheel.

6 Claims, 22 Drawing Sheets

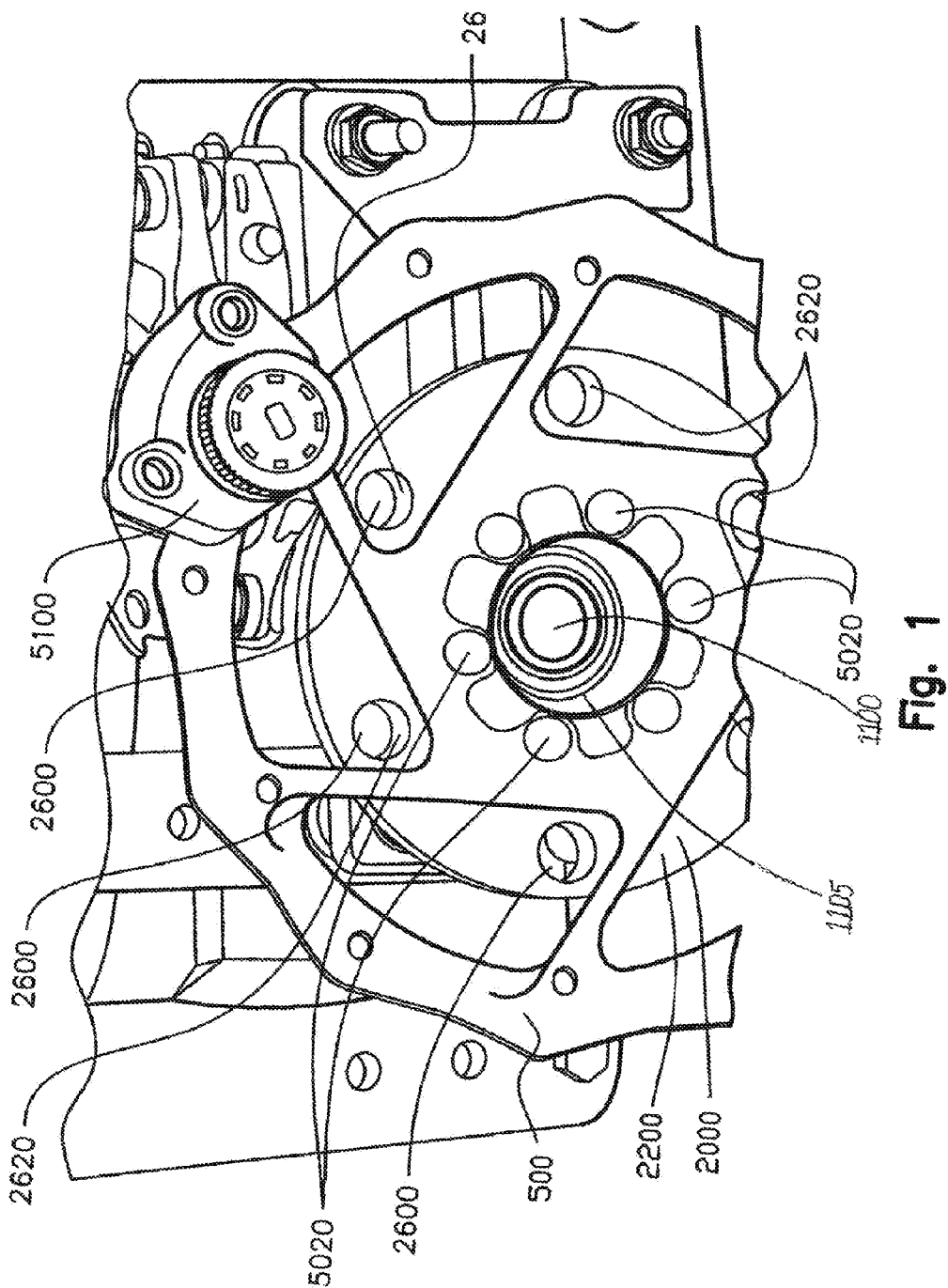

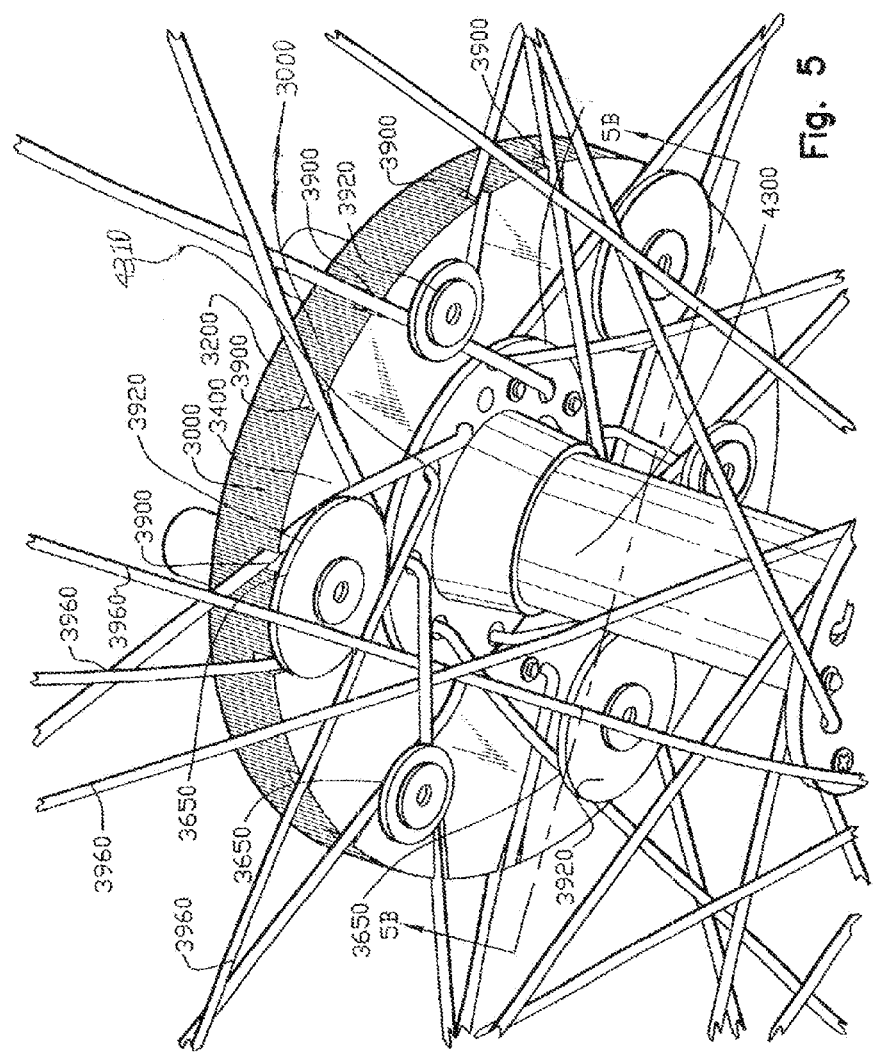

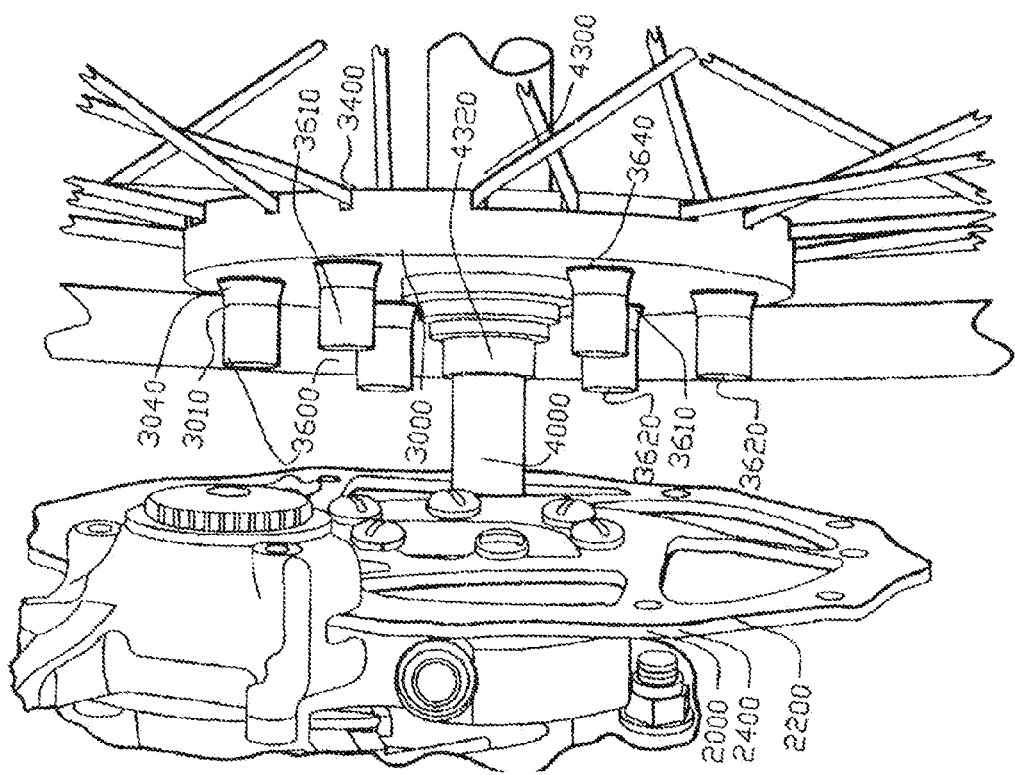

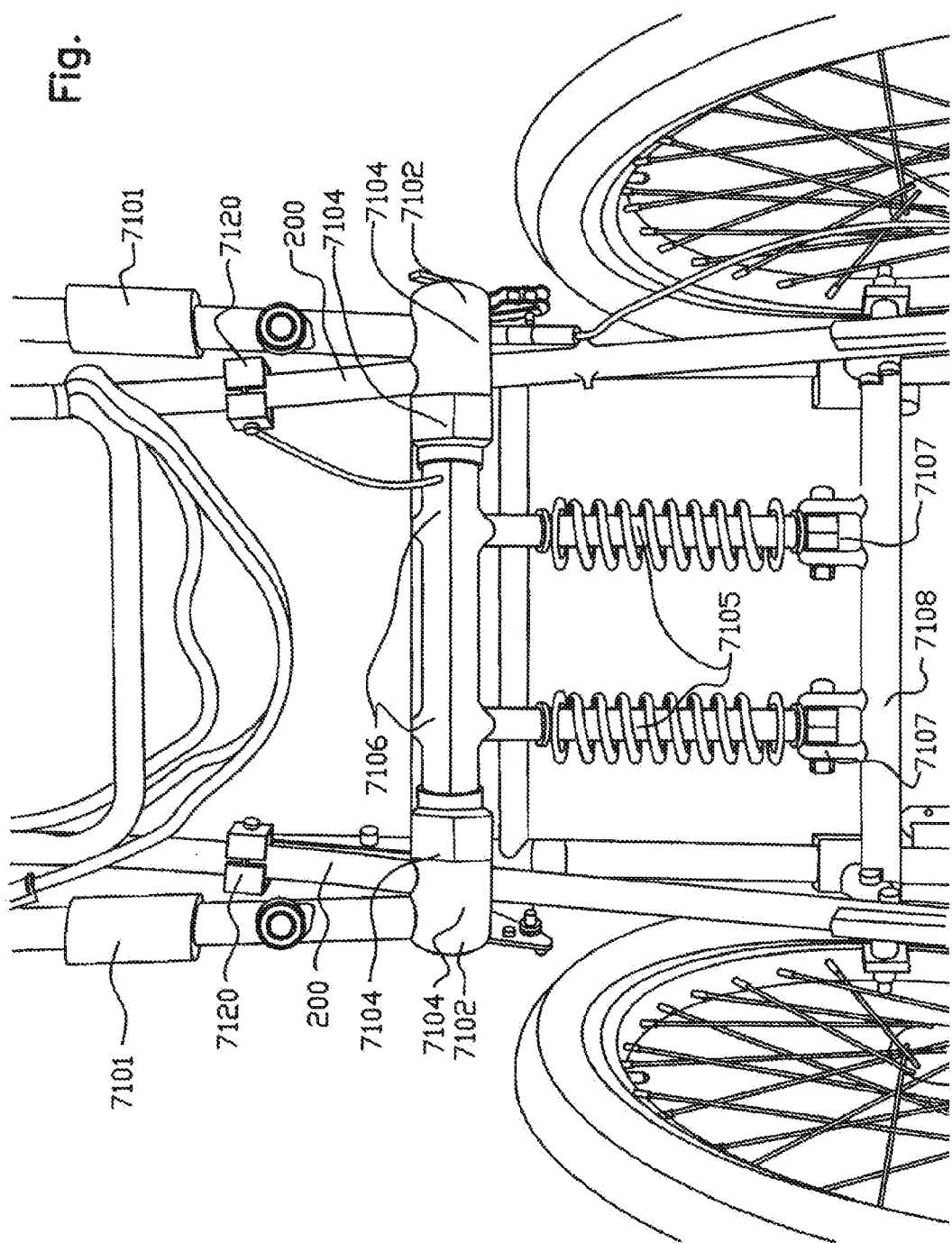

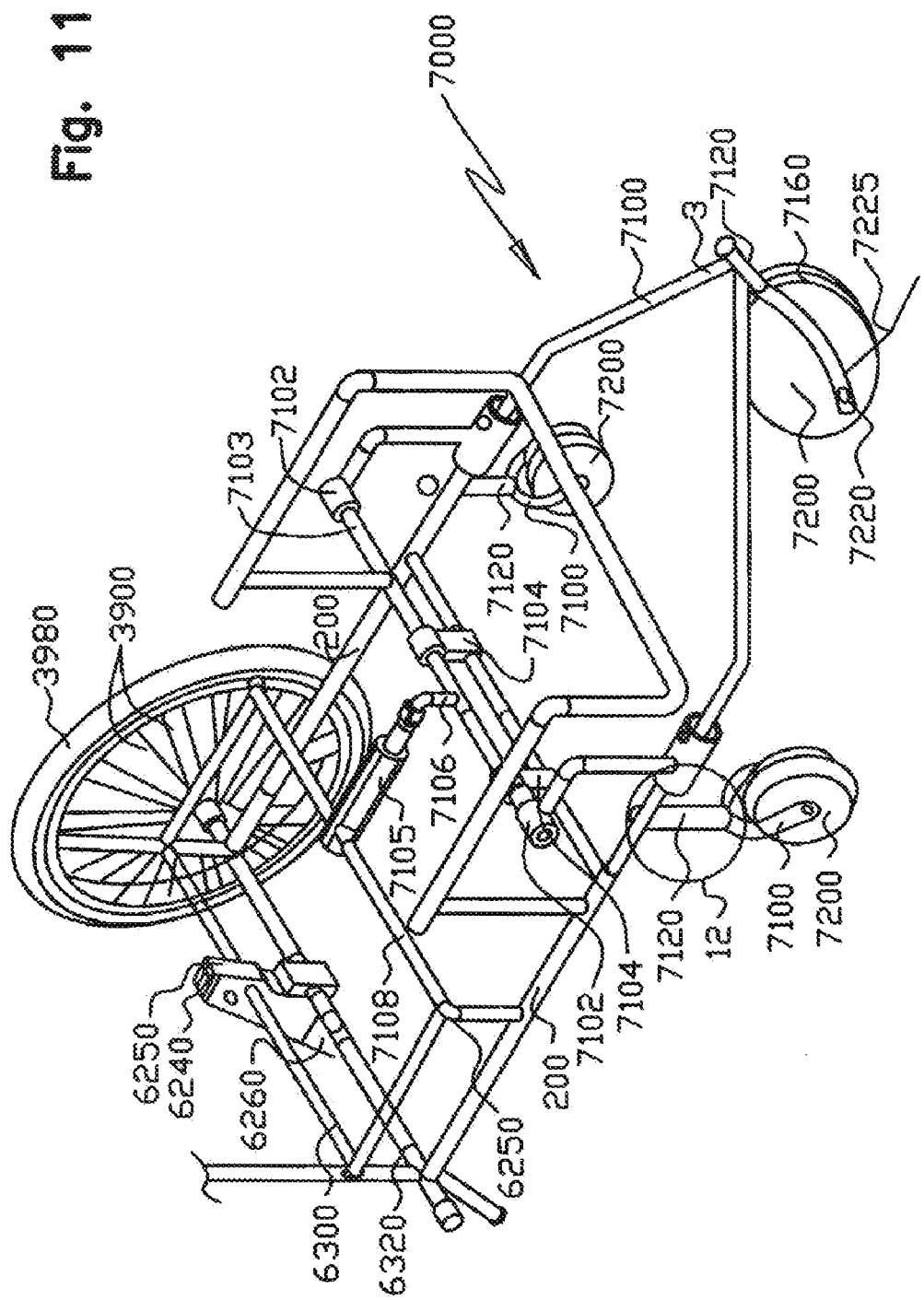

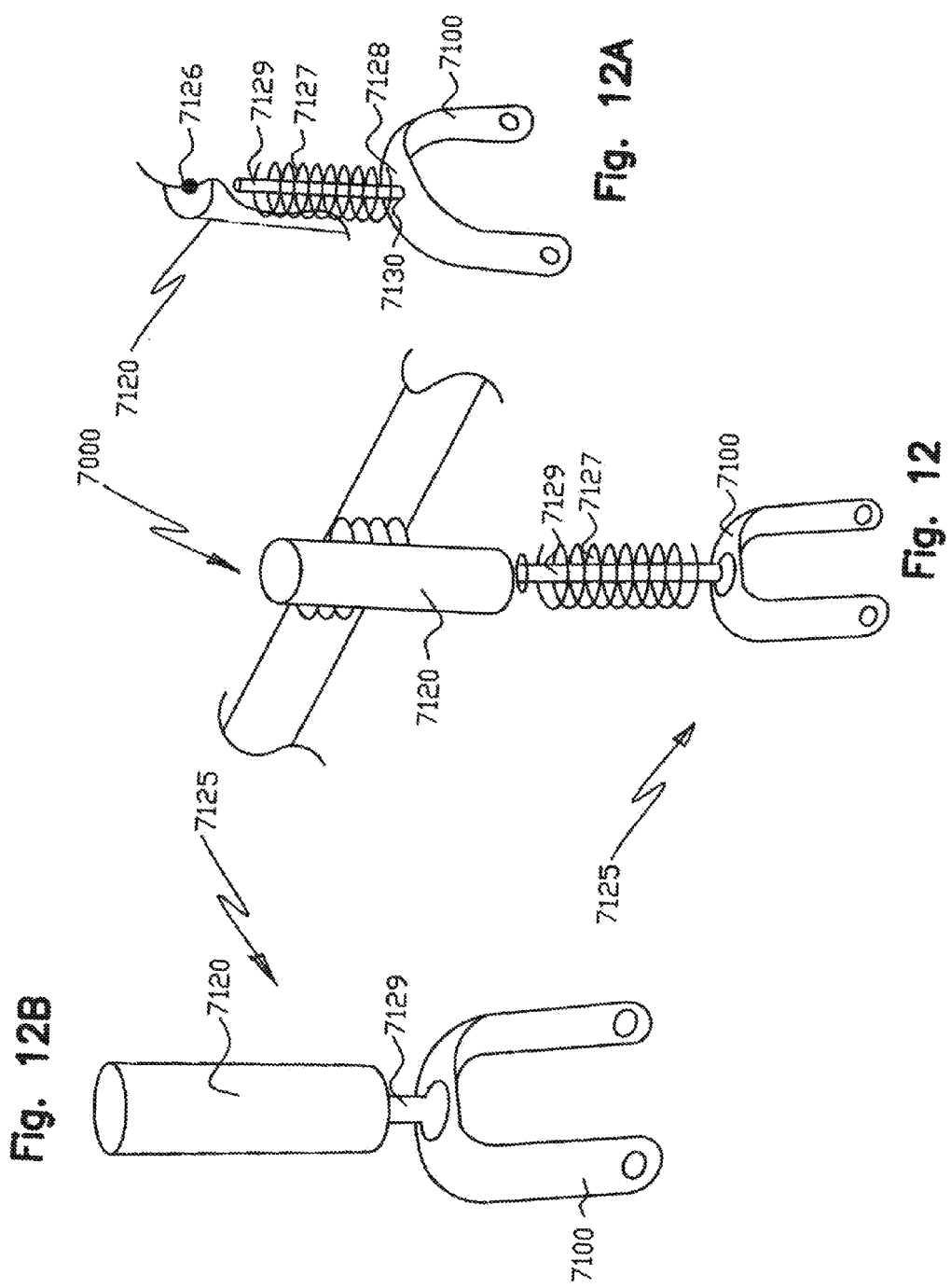

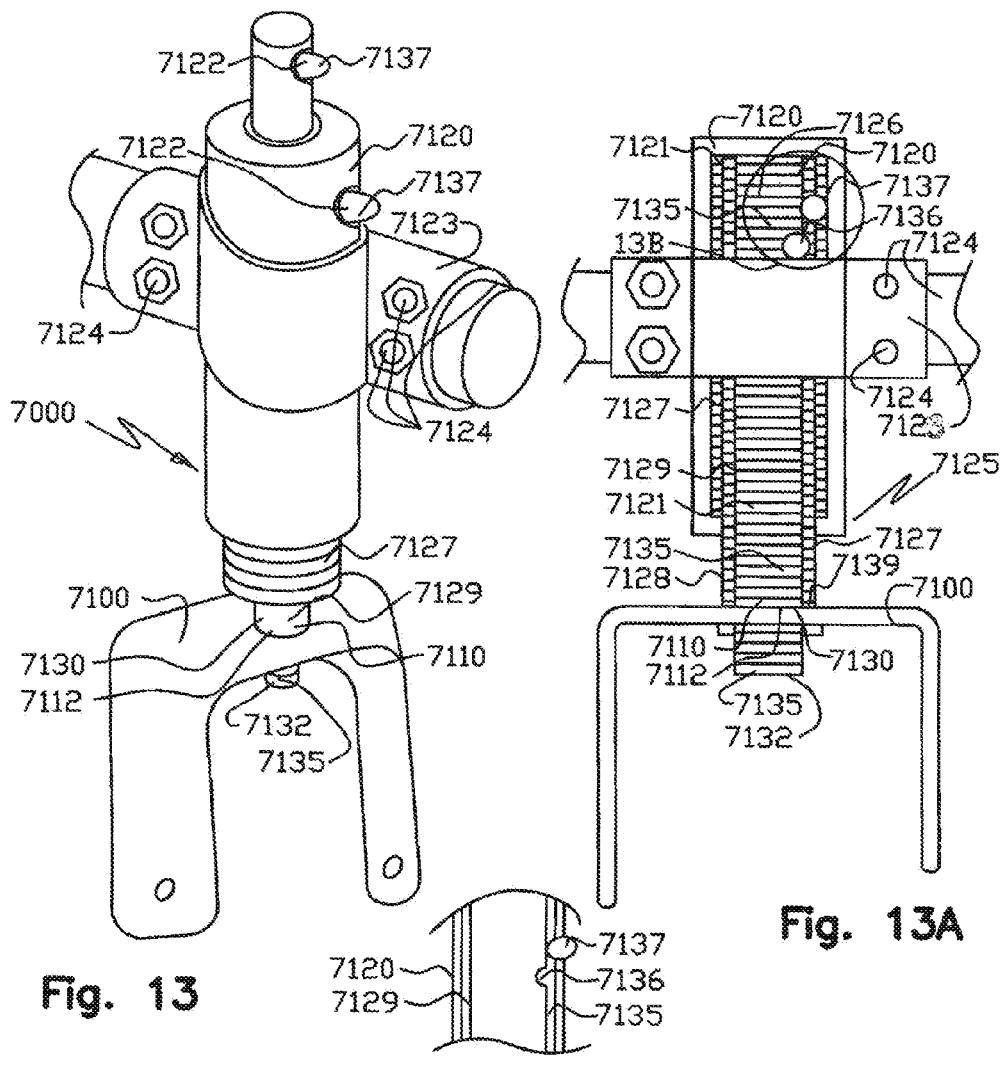

OFF-ROAD WHEELCHAIR DEVICE WITH SUSPENSION

FIELD OF THE INVENTION

The invention is an improvement in wheelchairs providing detachable wheels with disc brakes, an anti-wheelie wheel, front stabilizing wheels and suspension.

BACKGROUND OF THE INVENTION

Wheelchairs have traditionally been primarily limited to traversing flat smooth surfaces with few obstacles. Some limited off-road vehicles have been seen in the art. However, those noted are limited to relatively smooth surfaces and earth or grass surfaces which are dry and firm. Such wheelchairs are generally not operable on rough or rocky surfaces or in sand or snow and are inclined to become stuck in sand or snow. Prior art wheelchairs are inclined to tip over backwards if the front wheels become elevated. The front wheels in prior art wheelchairs become easily mired in soft surfaces, such as sand or snow. Braking methods on prior art wheelchairs are generally friction bar contact with the primary propulsion wheels. Such braking methods do not provide sufficient control where the wheelchair may operate at higher speeds. The present inventor's Pending Patent application 20070018443 addresses advancements for the utility of wheelchairs in off-road terrain.

SUMMARY OF THE INVENTION

This invention comprises a easily detachable wheels allowing interchange of speciality wheels. Disk brakes are provided which provides for greater stopping control and which allows steering control via application of disproportionate braking between the two braking controlled wheels. Operation of a wheelchair in rough or steep terrain can raise the front of the wheelchair such that the chair is inclined to tip over backwards. The Anti-Wheelie Wheel, at the rear of the wheelchair can be positioned to stabilize the wheelchair in rough or steep terrain. It will be recognized that the anti-wheelie wheel will be applicable to all wheelchair uses whether indoors or out of doors in rough or soft surface terrain. Stabilizing wheels at the front allows the wheelchair to backup to avoid sand or other obstacles without facing the problem encountered with standard narrow width wheels which are inclined to spin thereby forming a hole or depression and becoming stuck.

BRIEF DESCRIPTION OF THE DRAWINGS

The foregoing and other features and advantages of the present invention will become more readily appreciated as the same become better understood by reference to the following detailed description of the preferred embodiment of the invention when taken in conjunction with the accompanying drawings, wherein:

FIG. 1 illustrates the hub wheel mount plate (2000) with an attached brake rotor (5000) and FIG. 1A is an exploded view of the wheel mount plate (2000) and brake rotor (5000).

FIGS. 4, 4A and 4B show additional detail of the wheel mount plate (3000) illustrating multiple wheel mount plate keys (3600) at the wheel mount plate front (3200), wheel mount plate key chamfer (3610) seen at the wheel mount plate keys (3600), wheel mount plate key insertion end (3620) at the wheel mount plate front (3200), wheel mount plate key attachment end (3640) at the wheel mount plate front (3200) and at the wheel mount plate rear (3400). Also seen is the at least one wheel mount plate key aperture (3660), a wheel mount plate axle aperture (3800) and at least one wheel mount plate spoke slot (3900). FIG. 4B is a section from FIG. 4 showing FIGS. 5 and 5A illustrates the wheel mount plate (3000) at the wheel mount plate rear (3400) including wheel mount plate spoke retainers (3920), axle housing (4300), hub spoke aperture (3940) and spokes (3960). Seen in FIGS. 5 and 5A are spokes (3960) received by wheel mount plate spoke slots (3900) and by hub spoke apertures (3940). Also seen in FIGS. 5 and 5A are wheel mount plate key insertion end (3620), wheel mount plate key attachment ends (3640), wheel mount plate key attachment end rivets (3650) and wheel mount plate spoke retainers (3920).

FIGS. 6 and 6A shows the interconnection of the hub wheel mount plate (2000) and the wheel mount plate (3000) with axle (4000) received by the hub axle aperture (1100). Also seen is axle hub insertion end (4100), axle detent (4200) and axle spacer (4320).

FIG. 7C illustrates an alternative interconnection between the anti-wheelie wheel frame (6140) and the anti-wheelie wheel unit frame (6100). FIG. 7D details the anti-wheelie wheel frame position adjustment device (6213). FIG. 7E illustrates an alternative embodiment of the anti-wheelie wheel unit frame (6100) and the anti-wheelie wheel frame position adjustment frame (6200).

FIGS. 8, 9, 10, 11, 12, 12A, 12B, 13, 13A and 13B which show the stabilizing wheel unit (7000) illustrating the front stabilizing frame (7100), stabilizing wheel (7200) and standard wheel (7210). Seen in FIGS. 12, 12A and 12B is a suspension means provided by a front stabilizing frame suspension spring (7127) comprising either a spring, as illustrated in FIGS. 12 and 12A or a pneumatic or hydraulic cylinder with shaft as illustrated in FIG. 12B. Illustrated is at least one front stabilizing frame bearing and bushing (7120) at the right side (8) and left side (9) or in front (3) showing at least one front stabilizing frame bearing and bushing (7120) immovably affixed to the wheel chair (1).

DETAILED DESCRIPTION

Figure 1A:
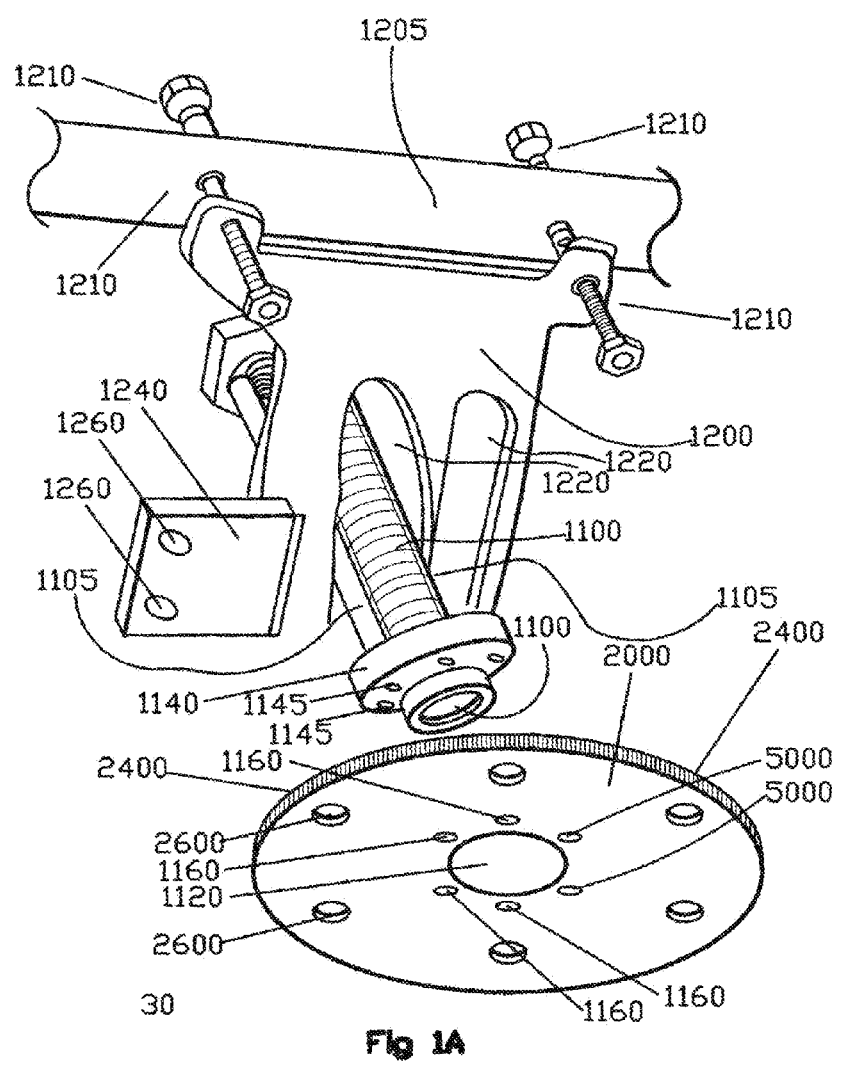
Figure 2:
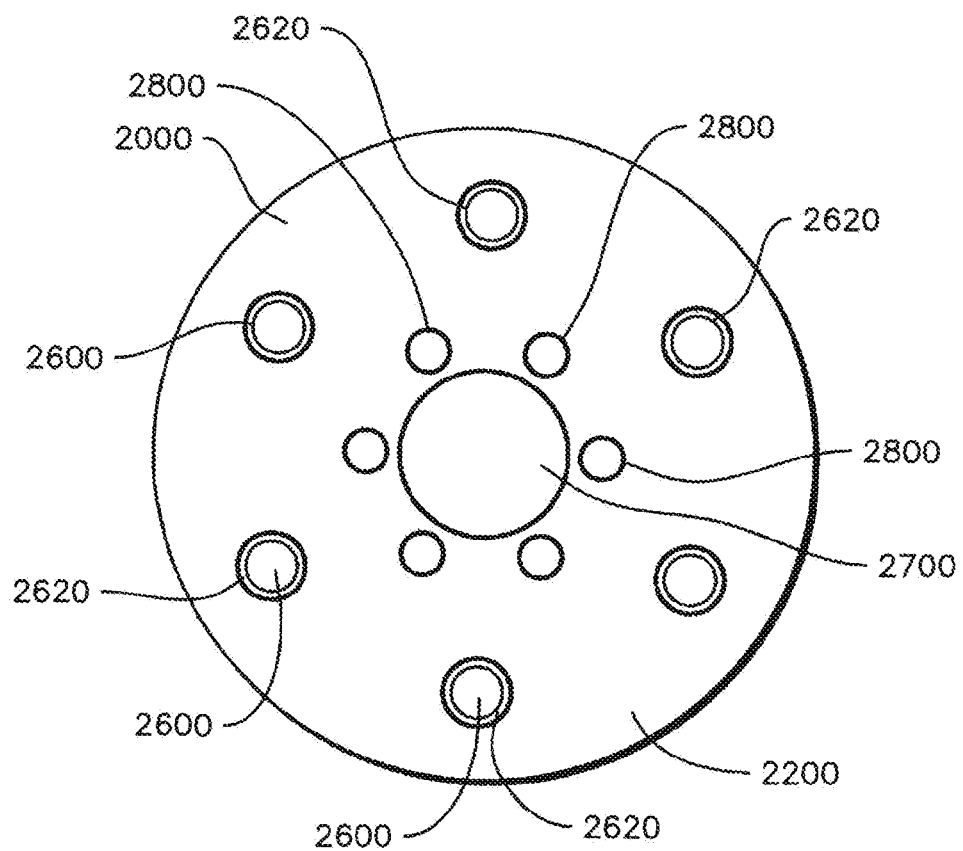
FIG. 2 shows additional detail of the hub wheel mount plate (2000).
Figure 3:
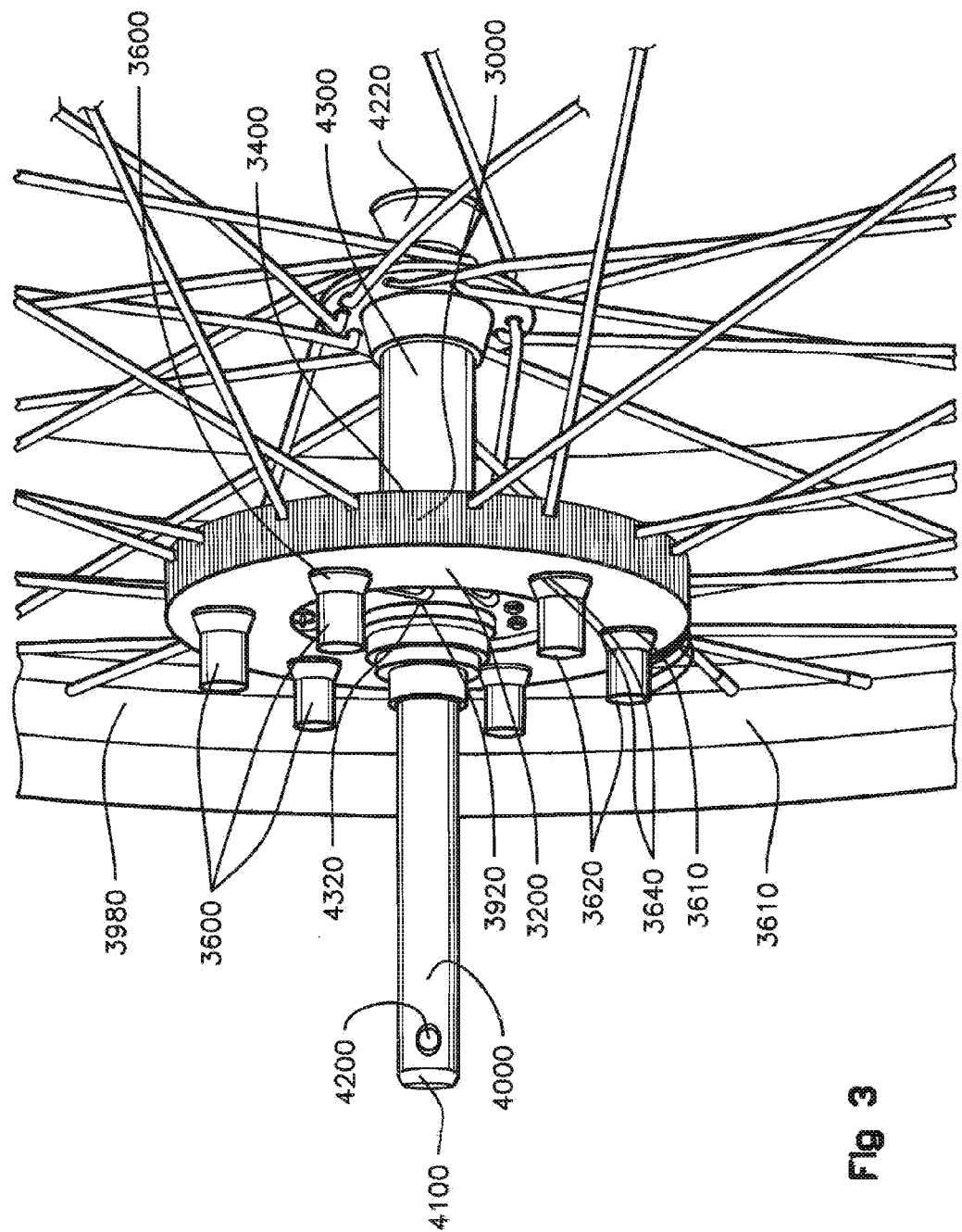
FIG. 3 illustrates a wheel mount plate (3000) having at least one wheel mount plate key (3600). Also seen is the axle (4000), axle hub insertion end (4100), axle detent (4200), axle detent actuator (4220) axle housing (4300) and axle spacer (4320).
Figure 4A:
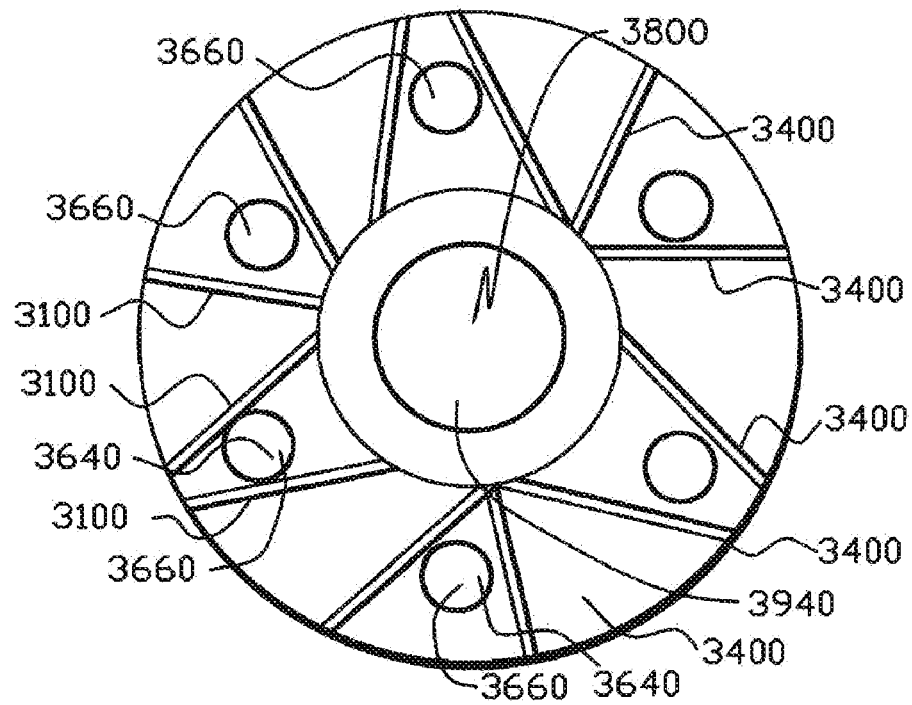
Figure 4:
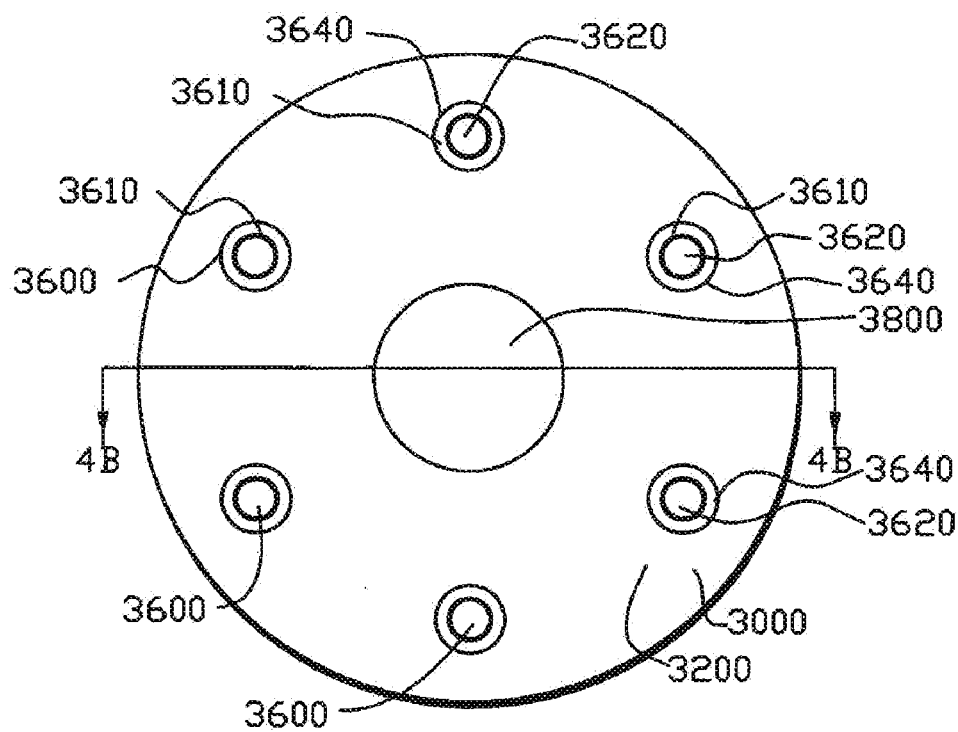
Figures 4B, 5A:
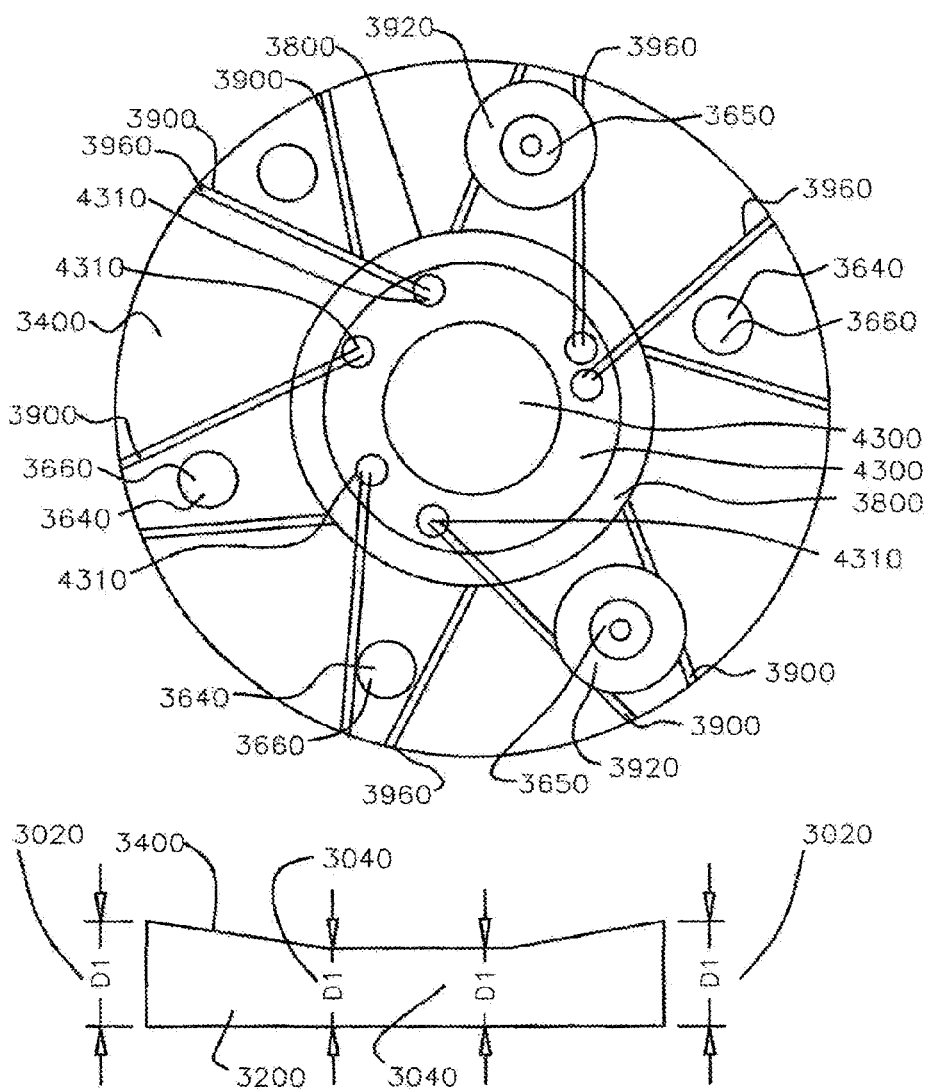
Figure 6:
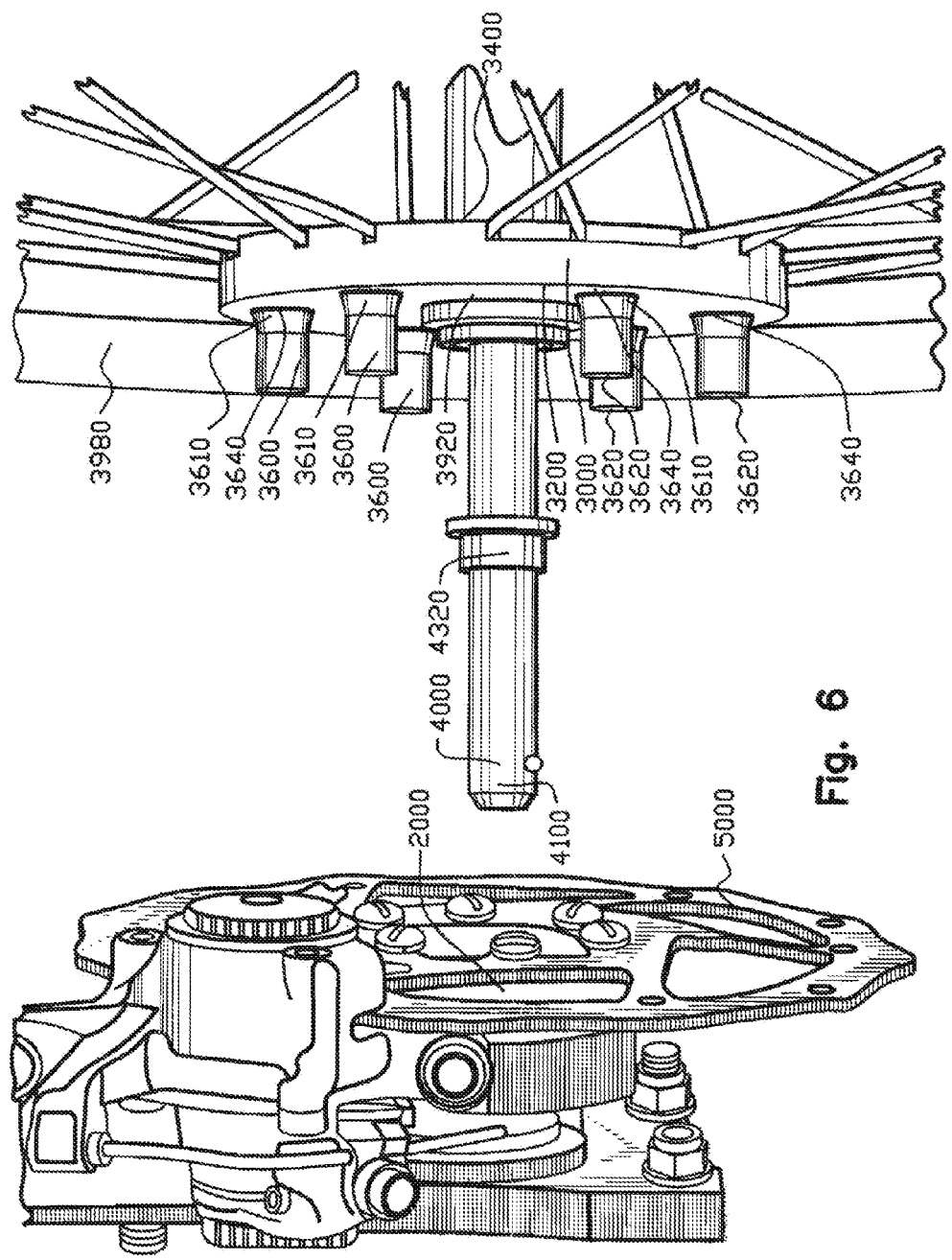

The improved Off-Road Wheelchair of this application is illustrated in FIGS. 1 through 11. FIG. 11 illustrates the off-road wheelchair (1) having a front (3), a rear (7), a right side (8) and a left side (9) and a generally tubular main frame (200). Illustrated is a detachable wheel with disc brake unit (1000) having an elongated tubular hub (1100) with a hub axle aperture (1105) affixed by a hub mount bracket (1200), at the right side (8) and at the left side (9).

The detachable wheel with disc brake unit (1000), seen in FIGS. 1 through 6A, has a generally planar and disc shaped hub wheel mount plate (2000) having a hub wheel mount plate front (2200), a hub wheel mount plate rear (2400) and a centrally positioned hub axle aperture (1120). The hub (1100) is friction received by the wheel mount plate (2000) at the mount plate rear (2400). A generally disc shaped hub to hub wheel mount plate connector (1140) is immovably affixed to the hub (1100) and is in surface contact with the mount plate rear (2400) when the hub (1100) is received by the mount plate rear (2400).

The hub to hub wheel mount plate connector (1140) has at least one hub to hub wheel mount plate connector aperture (1145) aligned with at least one hub mounting aperture (1160) from the hub wheel mount plate front (2200) to the hub wheel mount plate rear (2400). The hub wheel mount plate (2000) is securely and immovably affixed to the hub to hub wheel mount plate connector (1140) by screw or bolt and thread. At least one hub wheel mount plate wheel aperture (2600) having a hub wheel mount plate wheel aperture chamfer (2620) is proximal the plate front (2200).

A generally planar disc shaped wheel mount plate (3000) having a wheel mount plate front (3200), a wheel mount plate rear (3400), at least one elongated and cylindrical wheel mount plate key (3600) extending outwardly from the wheel mount plate front (3200). The at least one wheel mount plate key (3600) has a wheel mount plate key insertion end (3620) distal from the wheel mount plate front (3200) and a wheel mount plate key attachment end (3640) proximal the wheel mount plate front (3200). In the preferred embodiment there are multiple wheel mount plate keys (3600).

The at least one wheel mount plate key (3600) is formed and sized to be slidably and securely received, at the wheel mount plate key insertion end (3620) by the at least one hub wheel mount plate wheel aperture (2600). In the preferred embodiment there will be multiple wheel mount plate key (3600) and multiple wheel mount plate wheel apertures (2600). The at least one wheel mount plate key (3600) is, in the preferred embodiment, chamfered at the wheel mount plate key attachment end (3640) proximal the wheel mount plate front (3200).

The at least one hub wheel mount plate wheel aperture (2600) is shaped to securely receive the at least one wheel mount plate key (3600). The wheel mount plate key attachment end (3640) is immovably affixed at the wheel mount plate (3000) by immovable affixing means (3650) including welding, thread, by being received by a wheel mount plate key aperture (3660) and being secured by rivet, screw or welding.

The wheel mount plate (3000) has a centrally positioned wheel mount plate axle aperture (3800) from the wheel mount plate front (3200) to the wheel mount plate rear (3400). The wheel mount plate (3000) at the wheel mount plate rear (3400) has at least one wheel mount plate spoke slot (3900) radiating outwardly from the plate axle aperture (3800) and being sized and shaped and positioned to receive a bicycle spoke in a variety of bicycle spoke weave patterns.

An axle housing (4300) is aligned with the wheel mount plate rear (3400). At least one axle spoke aperture (4310) is positioned at the axle housing (4300). The at least one wheel mount plate spoke slot (3900) and the at least one axle spoke aperture (4310) securely receive bicycle spokes (3960) extending from a wheel rim (3980) in a bicycle spoke (3960) weave. The bicycle spokes (3960) immovably affixed at the wheel mount plate rear (3400) by at least one immovable disc or washer shaped wheel mount plate spoke retainer (3920) secured by welding, thread, by being received by a wheel mount plate key aperture (3660) and being secured by rivet, screw or by welding.

An elongated and generally tubular and cylindrical axle (4000) is received at the axle housing (4300) at an axle hub insertion end (4100) and through the axle housing (4300) through the wheel mount plate rear (3400) toward the wheel mount plate front (3200). An axle detent (4200) is proximal the axle hub insertion end (4100) and an axle detent actuator (4220) is distal to the axle hub insertion end (4100. At least one axle spacer (4320) is intermediate the wheel mount plate front (3200) and the axle detent actuator (4220).

A brake rotor (5000) has at least one brake rotor mounting aperture (5020) and a brake rotor wheel mount aperture (5040) centrally positioned at the brake rotor (5000). A caliper (5100) is immovably affixed by a hub mount bracket (1200) to the wheelchair (1) and is positioned to be engagingly received by the brake rotor (5000) upon operation of a closing means including a lever actuated cable. The at least one brake rotor mounting aperture (5020) is aligned with the at least one hub wheel mount rotor aperture (2800). The at least one brake rotor mounting aperture (5020) and the at least one hub wheel mount rotor aperture (2800) are immovably affixed with screw and thread, bolt or rivet.

Figure 7:
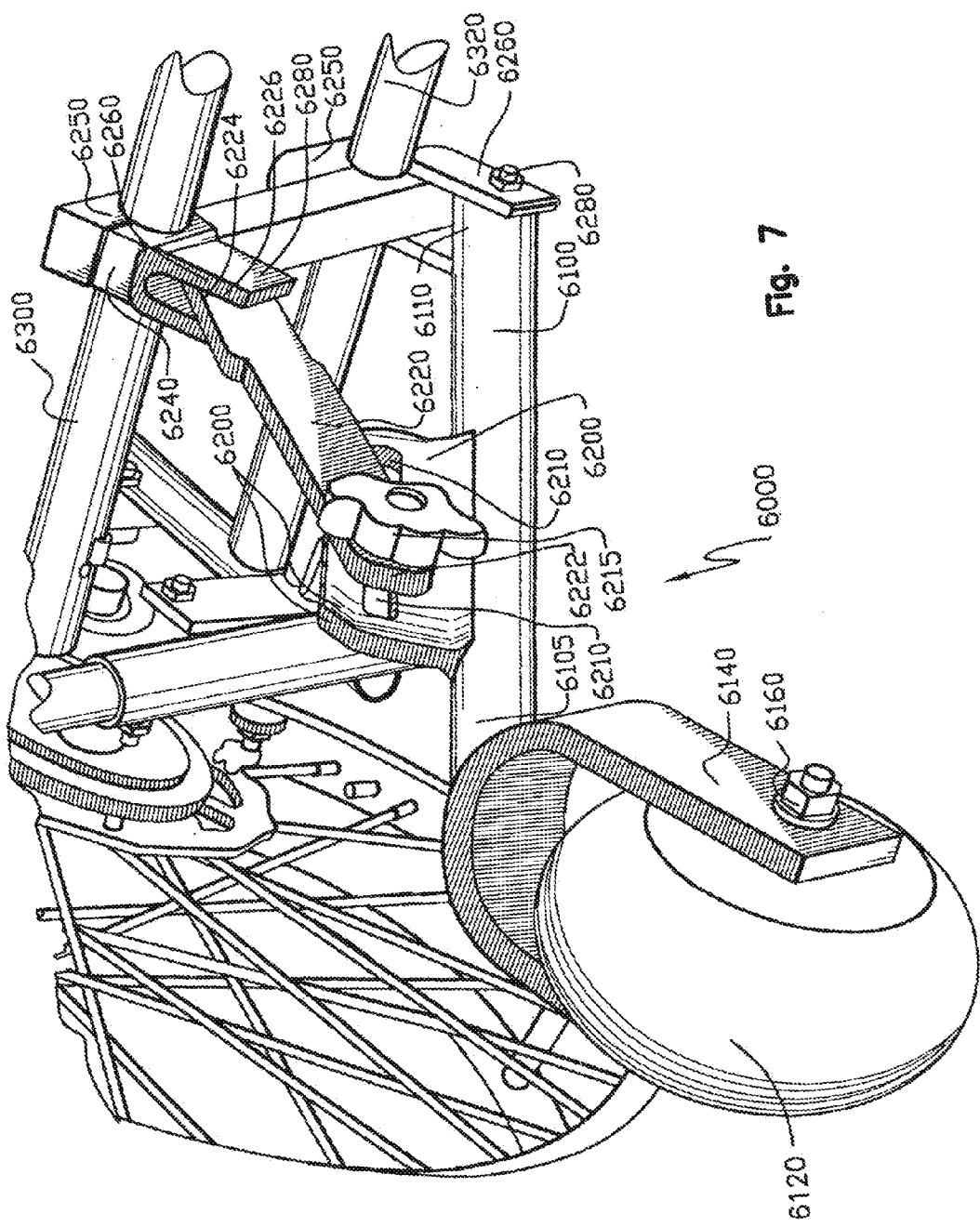
FIGS. 7, 7A, 7B, 7C, 7D, and 7E illustrate the anti-wheelie wheel unit (6000) showing the anti-wheelie wheel unit frame (6100) with anti-wheelie wheel (6120), anti-wheelie wheel frame position adjustment frame (6200), anti-wheelie wheel attachment bracket (6240). wheelchair rear upper frame (6300) and wheelchair rear lower frame (6320).
Figure 7A:
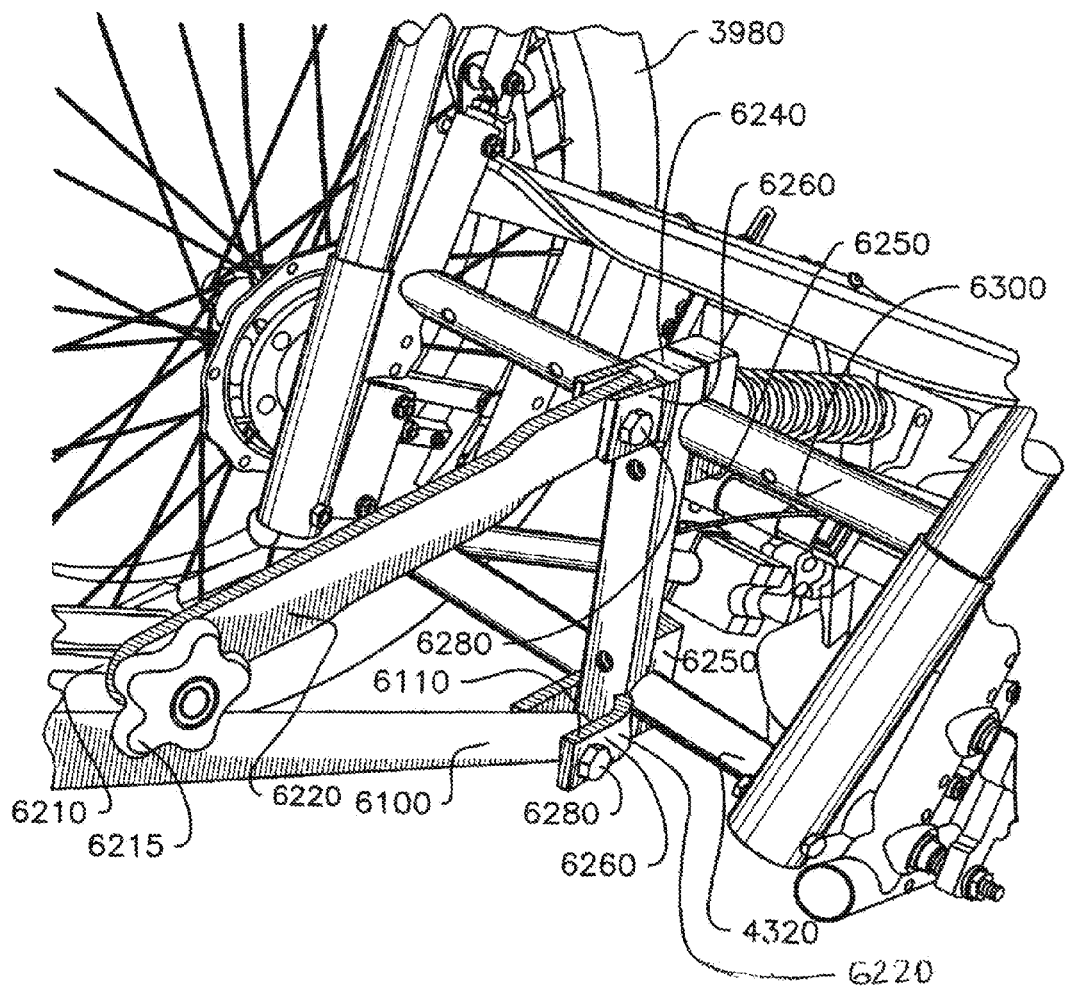
Figure 7B:
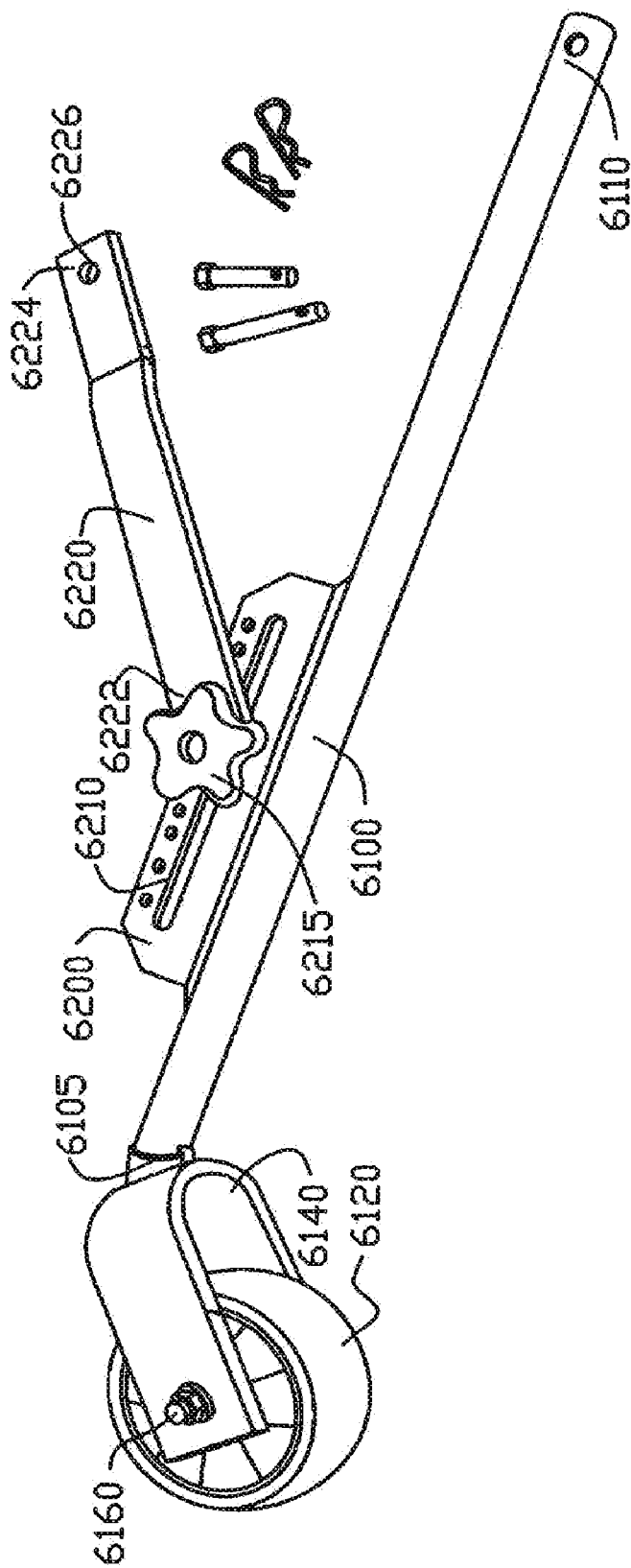
Figure 7C:
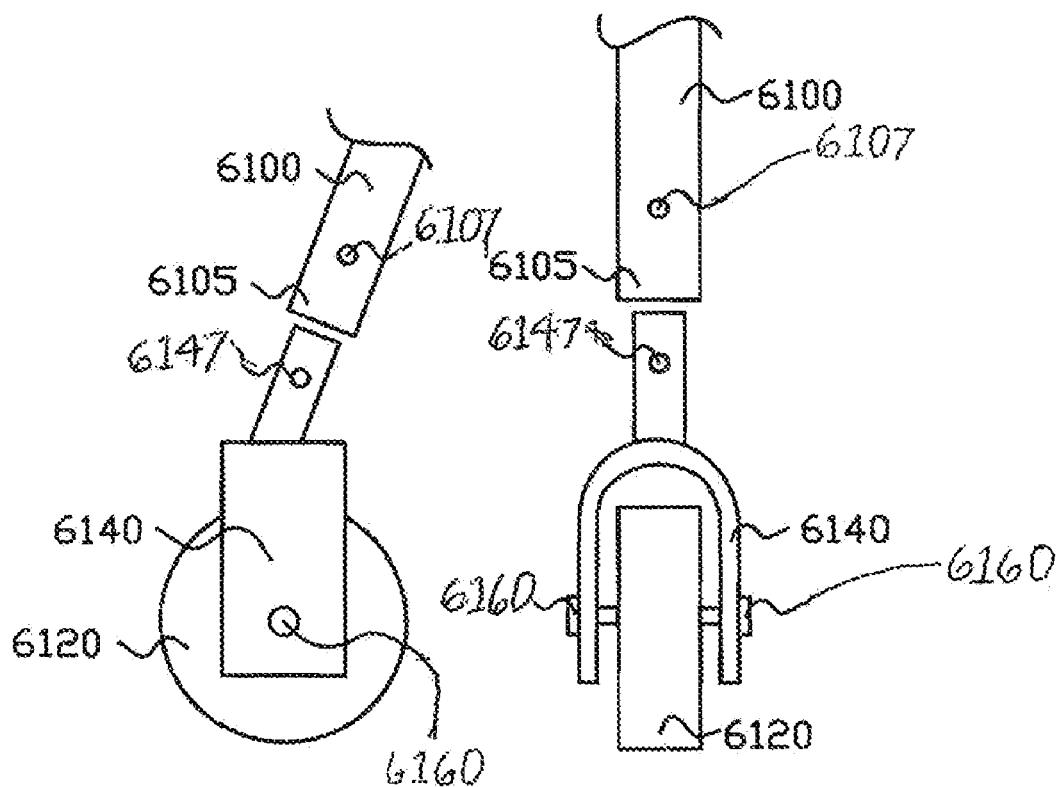
Figure 7D:
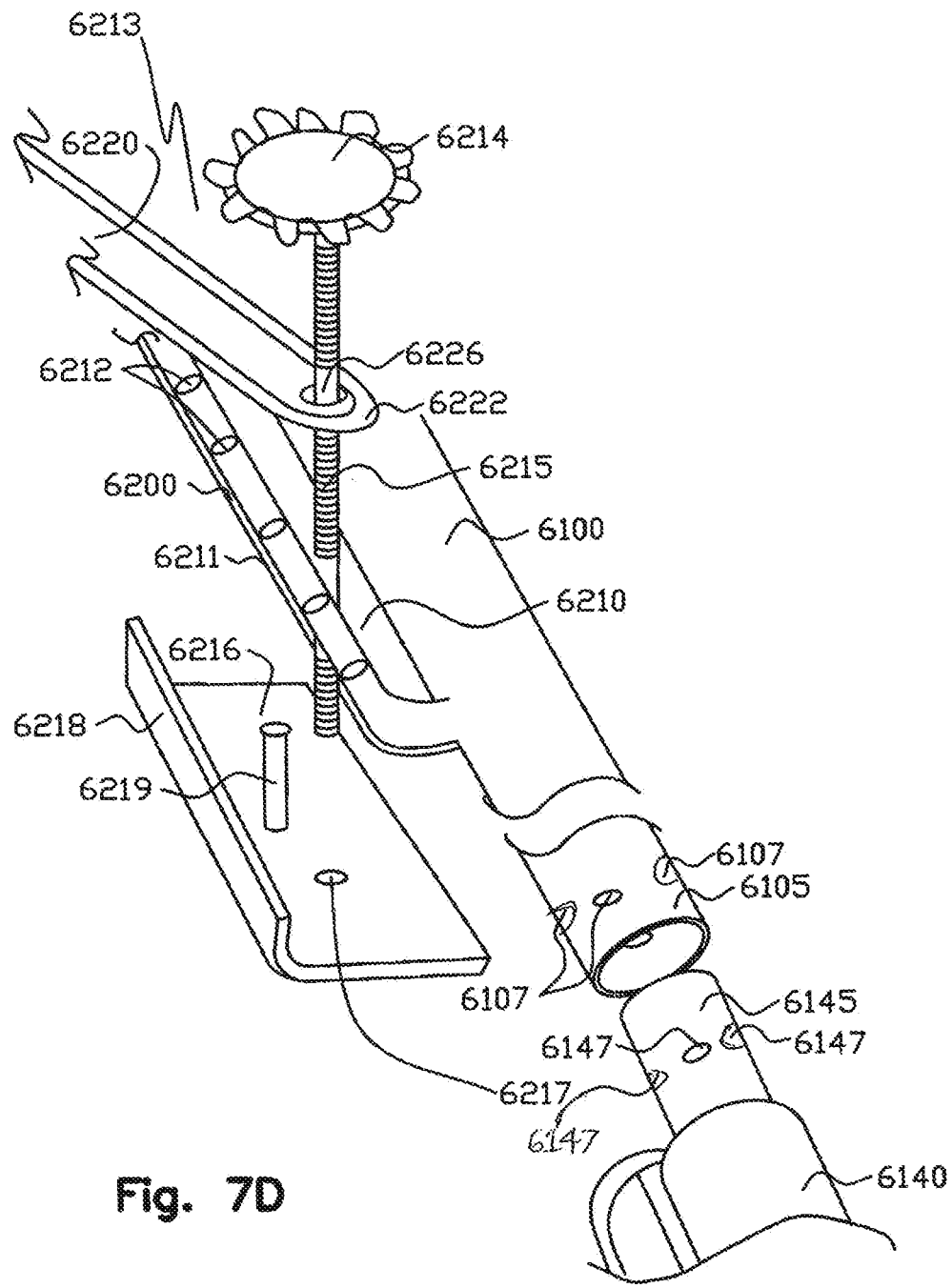
Figure 7E:
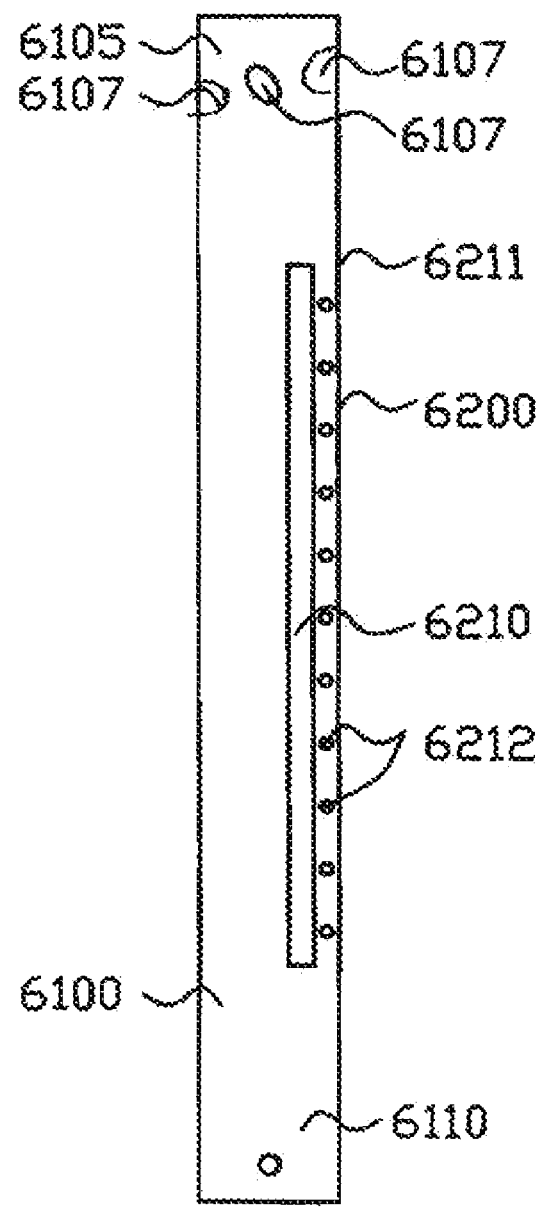
Figure 8:
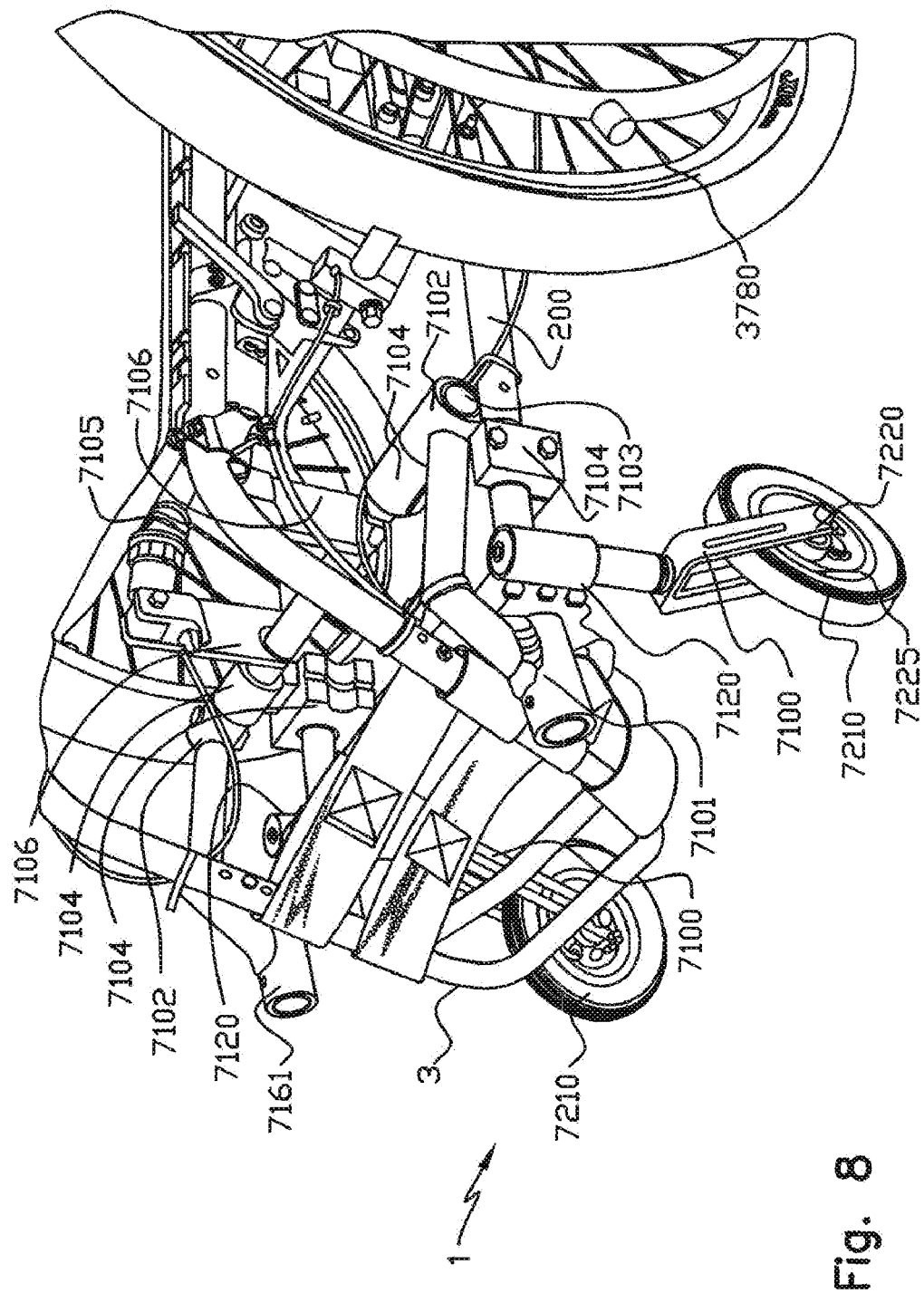
Figure 9:
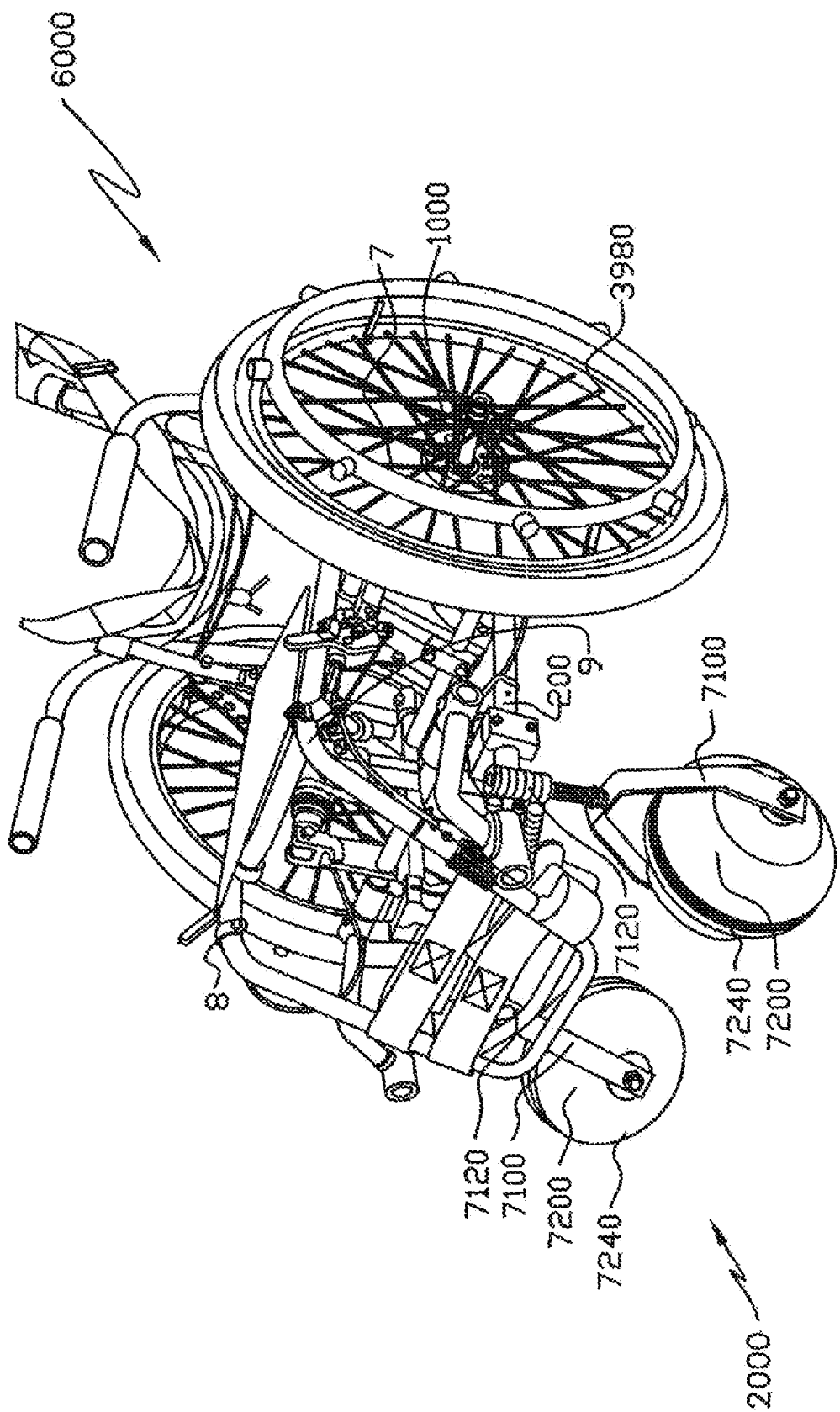
Figure 10:
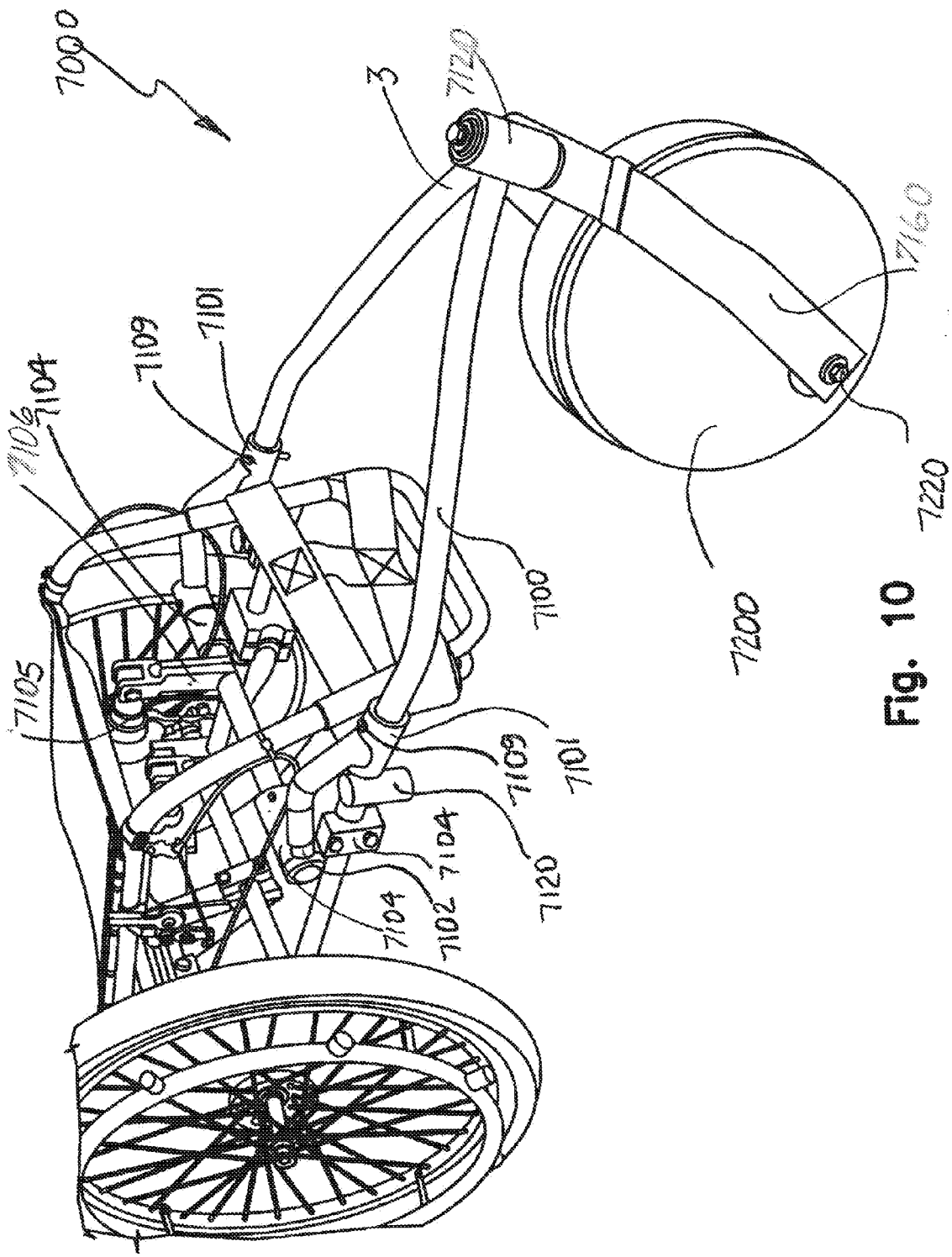

An anti-wheelie wheel unit (6000), seen in FIGS. 7 through 7E, has an elongated tubular or bar constructed anti-wheelie wheel unit frame (6100). The anti-wheelie wheel unit frame (6100) has a unit frame first end (6105) and a unit frame second end (6110). A generally U shaped anti-wheelie wheel frame (6140) is immovably affixed by welding or bolting at the unit frame first end (6105). The anti-wheelie wheel frame (6140) rotatably receives an anti-wheelie wheel (6120) by an anti-wheelie wheel axle (6160) comprised of nut and bolt.

An anti-wheelie wheel attachment bracket (6240) has an anti-wheelie wheel attachment bracket frame clamp (6250) immovably clamped at a transverse wheelchair rear upper frame (6300) and at a transverse wheelchair rear lower frame (6320). The anti-wheelie wheel attachment bracket (6240) is bolt and thread interconnected with the anti-wheelie wheel attachment bracket frame clamp (6250) allowing the interconnection to render immovable the attachment bracket (6240). The anti-wheelie wheel attachment bracket (6240) extends a generally U shaped anti-wheelie adjustment bar frame (6260) outwardly from the upper frame (6300) and from the lower frame (6320). An anti-wheelie adjustment aperture (6226) at the unit frame second end (6110) is received and is pivotally affixed by an anti-wheelie adjustment bar frame axle (6280), comprised generally a bolt and nut, at the generally U shaped anti-wheelie adjustment bar frame (6260) at the lower frame (6320).

An anti-wheelie wheel unit (6000) has an elongated tubular or bar constructed anti-wheelie wheel unit frame (6100). The anti-wheelie wheel unit frame (6100) has a unit frame first end (6105) and a unit frame second end (6110). A generally U shaped anti-wheelie wheel frame (6140) is affixed by frame affixing means at the unit frame first end (6105). The anti-wheelie wheel frame (6140) is either affixed at the unit frame first end (6105) by immovable affixing means of welding or riveting or the generally U shaped anti-wheelie wheel frame (6140) has an elongated anti-wheelie wheel frame connecting member (6145) extending rearwardly toward the unit frame first end (6105) and received into the wheel unit frame (6100) or receiving the wheel unit frame (6100) at the unit frame first end (6105) with at least one anti-wheelie wheel frame connecting member aperture (6147) at the frame connecting member (6145) aligned with and interconnected with at least one unit frame first end aperture (6107) proximal the unit frame first end (6105), with an anti-wheelie wheel frame connecting quick lock pin (6149). The quick lock pin (6149) comprises a quick lock or detent pen which positions an anti-wheelie wheel (6120) either downwardly extending for earth or surface contact or rotated 90° or 180° to be positioned to avoid contact with an individual pushing the wheel chair. The anti-wheelie wheel frame (6140) rotatably receives an anti-wheelie wheel (6120) by an anti-wheelie wheel axle (6160) comprised of nut and bolt.

An anti-wheelie wheel attachment bracket (6240) has an anti-wheelie wheel attachment bracket frame clamp (6250) immovably clamped at a transverse wheelchair rear upper frame (6300) and at a transverse wheelchair rear lower frame (6320). The anti-wheelie wheel attachment bracket (6240) is bolt and thread interconnected with the anti-wheelie wheel attachment bracket frame clamp (6250) allowing the interconnection to render immovable the attachment bracket (6240). The anti-wheelie wheel attachment bracket (6240) extends a generally U shaped anti-wheelie adjustment bar frame (6260) outwardly from the upper frame (6300) and from the lower frame (6320); an anti-wheelie adjustment aperture (6226) at the unit frame second end (6110) is received and is pivotally affixed by an anti-wheelie adjustment bar frame axle (6280), comprised generally a bolt and nut, at the generally U shaped anti-wheelie adjustment bar frame (6260) at the lower frame (6320).

An anti-wheelie wheel frame position adjustment frame (6200) is formed integral with the anti-wheelie wheel unit frame (6100) or alternatively extends outwardly from the anti-wheelie wheel unit frame (6100). The adjustment frame (6200) has an anti-wheelie wheel frame position adjustment top (6211). The adjustment frame (6200) has an elongated anti-wheelie wheel frame position adjustment slot (6210) formed therein. At least one anti-wheelie wheel frame position adjustment aperture (6212) is formed in the adjustment frame (6200) intermediate the adjustment top (6211) and the adjustment slot (6210).

An elongated tubular or generally planar anti-wheelie adjustment bar (6220) has an anti-wheelie adjustment bar first end (6222), an anti-wheelie adjustment bar second end (6224), an anti-wheelie adjustment aperture (6226) proximal the anti-wheelie adjustment bar first end (6222) and proximal the anti-wheelie adjustment bar second end (6224).

An anti-wheelie wheel frame position adjustment device (6213) comprising an anti-wheelie wheel frame position adjustment knob (6214) having an anti-wheelie wheel frame position adjustment bolt (6215) extending from the adjustment knob (6214) toward and through the anti-wheelie adjustment aperture (6226), proximal the anti-wheelie adjustment bar first end (6222), and the anti-wheelie wheel frame position adjustment slot (6210) toward an anti-wheelie wheel frame position bracket (6216) and threadably received at a threaded anti-wheelie wheel frame position bracket aperture (6217) formed in the frame position bracket (6216).

The frame position bracket (6216) has an anti-wheelie wheel frame position bracket top (6218). The position bracket top (6218) is bent toward the anti-wheelie wheel frame position adjustment top (6211). At least one elongated cylindrical anti-wheelie wheel frame position bracket key (6219) extends outwardly from the anti-wheelie wheel frame position bracket (6216) and is positioned to be received by one of the at least one of the anti-wheelie wheel frame position adjustment apertures (6212). The at least one frame position bracket key (6219) is received by one of the at least frame position adjustment apertures (6212) and the bent frame position bracket top (6218) is friction and contact received by the anti-wheelie wheel frame position adjustment top (6211) when the anti-wheelie wheel frame position adjustment knob (6214) is turned to tighten the anti-wheelie wheel frame position bracket (6216) against the anti-wheelie wheel frame position adjustment frame (6200).

The anti-wheelie adjustment bar second end (6224) and anti-wheelie adjustment aperture (6226) is received and is pivotally affixed by an anti-wheelie adjustment bar frame axle (6280), comprised generally of a bolt and nut, at the generally U shaped anti-wheelie adjustment bar frame (6260) at the upper frame (6300).

A stabilizing wheel unit (7000), shown in FIGS. 8 through 11, is at the wheelchair front (3). At least one front stabilizing frame bearing and bushing (7120) at the right side (8) and left side (9) or in front (3). The at least one front stabilizing frame bearing and bushing (7120) is immovably affixed to the wheel chair (1), receives either a standard wheel (7210) or a stabilizing wheel (7200) which is supported and secured by a generally U or V shaped pivoting front stabilizing frame (7100). The stabilizing frame (7100) is downwardly extending and rotatably affixed by a wheel axle and bearing (7220) to at least one standard wheel (7210) or at least one stabilizing wheel (7200). The downwardly extending stabilizing frame (7100) forms an acute angle relative to a downwardly extending perpendicular from the main frame (200).

When the front stabilizing frame (7100) and the at least one front stabilizing frame bearing and bushing (7120) is extending from the wheelchair front (3), there is at least one front stabilizing frame sleeve (7101) at the right side (8) and at the left side (9) each generally tubular and sized to receive the main frame member (200) extending outwardly and toward the wheelchair front (3); the least one front stabilizing frame sleeve (7101) at the right side (8) rigidly and tubularly interconnected with a generally cylindrical tubular front stabilizing frame transverse sleeve (7102) which is substantially orthogonal to the main frame member (200) at the right side (8); the least one front stabilizing frame sleeve (7101) at the left side (9) is rigidly and tubularly interconnected with a generally cylindrical tubular front stabilizing frame transverse sleeve (7102) which is substantially orthogonal to the main frame member (200) at the left side (9); the tubularly interconnection between the at least one front stabilizing frame sleeve (7101) and the front stabilizing frame transverse sleeve (7102) is offset upwardly from the main frame member (200) to allow access to the front stabilizing frame (7100) when existing at the right side (8) and at the left side (9); a front stabilizing frame front transverse frame member (7103) generally orthogonal to the main frame member (200) is generally cylindrical providing an axle function and is sized to be rotatably received at the right side (8) and at the left side (9) by respective front stabilizing frame transverse sleeve (7102); at least one front stabilizing frame bracket transverse bracket (7104) at the right side (8) and at the left side (9) comprising a bracket function for rigid and immovable attachment to the respective main frame member (200) and interconnected at the respective main frame member (200) by bolt or equivalent means for quick and easy installation and removal; an upwardly extending transverse sleeve from the at least one front stabilizing frame bracket transverse bracket (7104) oriented and aligned to rotatably receive the front stabilizing frame front transverse frame member (7103); at least one front stabilizing shock absorber (7105) comprised of a spring, pneumatic or hydraulic cylinder with shaft; at least one front stabilizing shock absorber front anchor (7106) upwardly extending and permanently and rigidly affixed to the front stabilizing frame front transverse frame member (7103); at least one front stabilizing shock absorber rear anchor (7107) permanently and rigidly affixed to the front stabilizing frame rear transverse frame member (7108); the rear transverse frame member (7108) generally comprising a main frame member (200) parallel with the front stabilizing frame front transverse frame member (7103); the at least one front stabilizing shock absorber (7105) movably and rotatably affixed to and between the at least one front stabilizing shock absorber front anchor (7106) and the at least one front stabilizing shock absorber rear anchor (7107) to function to absorb frame and wheel impacts; each of the at least one front stabilizing frame sleeve (7101), at the right side (8) and at the left side (9) receiving a the front stabilizing frame (7100) member; a front stabilizing frame sleeve aperture and bolt/nut (7109) penetrating the front stabilizing frame sleeve (7101) and the front stabilizing frame (7100) member to fixedly retain the front stabilizing frame (7100) during wheelchair use and to allow ease of assembly and disassembly;

The stabilizing wheel (7200) is ellipsoidal, spheroidal, or spherical having a major and minor axis or a diameter. The stabilizing wheel (7200) has a stabilizing wheel ridge (7240) protruding from the stabilizing wheel (7200) at the circumference of the stabilizing wheel (7200) orthogonal to the surface of travel; the stabilizing wheel ridge (7240) is convex.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. An improved Off-Road Wheelchair comprising:
a) a wheelchair (1) having a front (3), a rear (7), a right side (8) and a left side (9) and a generally tubular main frame (200); a detachable wheel with disc brake unit (1000) having an elongated tubular hub (1100) with a hub axle aperture (1105) affixed by a hub mount bracket (1200), at the right side (8) and at the left side (9);
b) the detachable wheel with disc brake unit (1000) having a generally planar and disc shaped hub wheel mount plate (2000) having a hub wheel mount plate front (2200), a hub wheel mount plate rear (2400) and a centrally positioned hub axle aperture (1120); the hub (1100) is friction received by the wheel mount plate (2000) at the mount plate rear (2400); a generally disc shaped hub to hub wheel mount plate connector (1140) is immovably affixed to the hub (1100) and is in surface contact with the mount plate rear (2400) when the hub (1100) is received by the mount plate rear (2400); the hub to hub wheel mount plate connector (1140) has at least one hub to hub wheel mount plate connector aperture (1145) aligned with at least one hub mounting aperture (1160) from the hub wheel mount plate front (2200) to the hub wheel mount plate rear (2400); the hub wheel mount plate (2000) is securely and immovably affixed to the hub to hub wheel mount plate connector (1140) by screw or bolt and thread; at least one hub wheel mount plate wheel aperture (2600) having a hub wheel mount plate wheel aperture chamfer (2620) proximal the plate front (2200);
c) a generally planar disc shaped wheel mount plate (3000) having a wheel mount plate front (3200), a wheel mount plate rear (3400), at least one elongated and cylindrical wheel mount plate key (3600) extending outwardly from the wheel mount plate front (3200); the at least one wheel mount plate key (3600) having a wheel mount plate key insertion end (3620) distal from the wheel mount plate front (3200) and a wheel mount plate key attachment end (3640) proximal the wheel mount plate front (3200);
d) the at least one wheel mount plate key (3600) formed and sized to be slidably and securely received, at the wheel mount plate key insertion end (3620) by the at least one hub wheel mount plate wheel aperture (2600); the at least one wheel mount plate key (3600) chamfered at the wheel mount plate key attachment end (3640) proximal the wheel mount plate front (3200); the at least one hub wheel mount plate wheel aperture (2600) shaped to securely receive the at least one wheel mount plate key (3600); the wheel mount plate key attachment end (3640) immovably affixed at the wheel mount plate (3000) by immovable affixing means (3650) including welding, thread, by being received by a wheel mount plate key aperture (3660) and being secured by rivet, screw or welding;
e) the wheel mount plate (3000) having a centrally positioned wheel mount plate axle aperture (3800) from the wheel mount plate front (3200) to the wheel mount plate rear (3400); the wheel mount plate (3000) at the wheel mount plate rear (3400) having at least one wheel mount plate spoke slot (3900) radiating outwardly from the plate axle aperture (3800) and being sized and shaped to receive a bicycle spoke in a variety of bicycle spoke weave patterns; an axle housing (4300) aligned with the wheel mount plate rear (3400); at least one axle spoke aperture (4310) at the axle housing (4300); the at least one wheel mount plate spoke slot (3900) and the at least one axle spoke aperture (4310) securely receiving bicycle spokes (3960) extending from a wheel rim (3980) in a bicycle spoke (3960) weave; the bicycle spokes (3960) immovably affixed at the wheel mount plate rear (3400) by at least one immovable disc or washer shaped wheel mount plate spoke retainer (3920) secured by welding, thread, by being received by a wheel mount plate key aperture (3660) and being secured by rivet, screw or welding;
f) an elongated and generally tubular and cylindrical axle (4000) received at the axle housing (4300) at an axle hub insertion end (4100) and through the axle housing (4300) through the wheel mount plate rear (3400) toward the wheel mount plate front (3200); an axle detent (4200) proximal the axle hub insertion end (4100) and an axle detent actuator (4220) distal to the axle hub insertion end (4100); at least one axle spacer (4320) intermediate the wheel mount plate front (3200) and the axle detent actuator (4220);
g) a brake rotor (5000) having at least one brake rotor mounting aperture (5020) and a brake rotor wheel mount aperture (5040) centrally positioned at the brake rotor (5000); a caliper (5100) immovably affixed by a hub mount bracket (1200) to the wheelchair (1) and positioned to be engagingly received by the brake rotor (5000) upon operation of a closing means including a lever actuated cable; the at least one brake rotor mounting aperture (5020) aligned with the at least one hub wheel mount rotor aperture (2800); the at least one brake rotor mounting aperture (5020) and the at least one hub wheel mount rotor aperture (2800) receiving immovable affixing means including screw and thread, bolt and rivet;
h) an anti-wheelie wheel unit (6000) having an elongated tubular or bar constructed anti-wheelie wheel unit frame (6100); the anti-wheelie wheel unit frame (6100) has a unit frame first end (6105) and a unit frame second end (6110); a generally U shaped anti-wheelie wheel frame (6140) affixed by frame affixing means at the unit frame first end (6105); the anti-wheelie wheel frame (6140) either affixed at the unit frame first end (6105) by immovable affixing means of welding or riveting or the generally U shaped anti-wheelie wheel frame (6140) having an elongated anti-wheelie wheel frame connecting member (6145) extending rearwardly toward the unit frame first end (6105) and received into the wheel unit frame (6100) or receiving the wheel unit frame (6100) at the unit frame first end (6105) with at least one anti-wheelie wheel frame connecting member aperture (6147) at the frame connecting member (6145) aligned with and interconnected with at least one unit frame first end aperture (6107) proximal the unit frame first end (6105), with an anti-wheelie wheel frame connecting quick lock pin (6149), comprising a quick lock or detent pen, to position an anti-wheelie wheel (6120) either downwardly extending for earth or surface contact or rotated 90° or 180° to be positioned to avoid contact with an individual pushing the wheel chair; the anti-wheelie wheel frame (6140) rotatably receives the anti-wheelie wheel (6120) by an anti-wheelie wheel axle (6160) comprised of nut and bolt;

I) an anti-wheelie wheel attachment bracket (6240) having an anti-wheelie wheel attachment bracket frame clamp (6250) immovably clamped at a transverse wheelchair rear upper frame (6300) and at a transverse wheelchair rear lower frame (6320); the anti-wheelie wheel attachment bracket (6240) bolt and thread interconnected with the anti-wheelie wheel attachment bracket frame clamp (6250) allowing the interconnection to render immovable the attachment bracket (6240); the anti-wheelie wheel attachment bracket (6240) extending a generally U shaped anti-wheelie adjustment bar frame (6260) outwardly from the upper frame (6300) and from the lower frame (6320); an anti-wheelie adjustment aperture (6226) at the unit frame second end (6110) is received and is pivotally affixed by an anti-wheelie adjustment bar frame axle (6280), comprised generally a bolt and nut, at the generally U shaped anti-wheelie adjustment bar frame (6260) at the lower frame (6320);

j) an anti-wheelie wheel frame position adjustment frame (6200) formed integral with the anti-wheelie wheel unit frame (6100) or alternatively extending outwardly from the anti-wheelie wheel unit frame (6100); the adjustment frame (6200) having an anti-wheelie wheel frame position adjustment top (6211); the adjustment frame (6200) having an elongated anti-wheelie wheel frame position adjustment slot (6210) formed therein; at least one anti-wheelie wheel frame position adjustment aperture (6212) formed in the adjustment frame (6200) intermediate the adjustment top (6211) and the adjustment slot (6210);

k) an elongated tubular or generally planar anti-wheelie adjustment bar (6220) having an anti-wheelie adjustment bar first end (6222), an anti-wheelie adjustment bar second end (6224); an anti-wheelie adjustment aperture (6226) proximal the anti-wheelie adjustment bar first end (6222) and proximal the anti-wheelie adjustment bar second end (6224);

l) an anti-wheelie wheel frame position adjustment device (6213) comprising an anti-wheelie wheel frame position adjustment knob (6214) having an anti-wheelie wheel frame position adjustment bolt (6215) extending from the adjustment knob (6214) toward and through anti-wheelie adjustment aperture (6226) proximal the anti-wheelie adjustment bar first end (6222) and the anti-wheelie wheel frame position adjustment slot (6210) toward an anti-wheelie wheel frame position bracket (6216) and threadably received at a threaded anti-wheelie wheel frame position bracket aperture (6217) formed in the frame position bracket (6216);

m) the frame position bracket (6216) having an anti-wheelie wheel frame position bracket top (6218); the position bracket top (6218) bent toward the anti-wheelie wheel frame position adjustment top (6211); at least one elongated cylindrical anti-wheelie wheel frame position bracket key (6219) extends outwardly from the anti-wheelie wheel frame position bracket (6216) and is positioned to be received by one of the at least one of the anti-wheelie wheel frame position adjustment apertures (6212); the at least one frame position bracket key (6219) is received by one of the at least frame position adjustment apertures (6212) and the bent frame position bracket top (6218) is friction and contact received by the anti-wheelie wheel frame position adjustment top (6211) when the anti-wheelie wheel frame position adjustment knob (6214) is turned to tighten the anti-wheelie wheel frame position bracket (6216) against the anti-wheelie wheel frame position adjustment frame (6200);

n) the anti-wheelie adjustment bar second end (6224) and anti-wheelie adjustment aperture (6226) is received and is pivotally affixed by an anti-wheelie adjustment bar frame axle (6280), comprised generally of a bolt and nut, at the generally U shaped anti-wheelie adjustment bar frame (6260) at the upper frame (6300);

o) a stabilizing wheel unit (7000) at the right side (8) and left side (9) or extending from the wheelchair front (3); when at the right side (8) and left side (9), at least one front stabilizing frame bearing and bushing (7120) at the right side (8) and left side (9) or in front (3); the at least one front stabilizing frame bearing and bushing (7120) is immovably affixed to the wheel chair (1), receives either a standard wheel (7210) or a stabilizing wheel (7200) which is supported and secured by a generally U or V shaped pivoting front stabilizing frame (7100); the stabilizing frame (7100) is downwardly extending rotatably affixed by a wheel axle and bearing (7220) to at least one standard wheel (7210) or at least one stabilizing wheel (7200); the downwardly extending stabilizing frame (7100) forms an acute angle (7225) relative to a downwardly extending perpendicular from the main frame (200) and the wheel axle and bearing (7220); the at least one front stabilizing frame bearing and bushing (7120) at the right side (8) and left side (9) or in front (3) providing an independent suspension comprising a front stabilizing frame suspension (7125); the front stabilizing frame suspension (7125) is tubular generally comprising a cylinder which is sized to receive, in ordinary use, an elongated rigid front stabilizing frame suspension detent shaft (7135) extending from a standard wheelchair wheel (7210) having a yoke and axle; the front stabilizing frame suspension detent shaft (7135) having a front stabilizing frame bearing and bushing ball aperture (7122) sized to permit a spring front stabilizing frame suspension detent ball (7137) to extend therefrom when the front stabilizing frame suspension detent shaft (7135) is inserted into the cylinder and through a cylinder aperture distal to the yoke; the cylinder aperture sized to retain the suspension detent shaft (7135) by release of the spring front stabilizing frame suspension detent ball (7137); off road wheelchair use is enabled when the standard wheel (7210) is released from the cylinder and replaced with a stabilizing wheel (7200) having a front stabilizing frame suspension detent shaft (7135) secured by a spring front stabilizing frame suspension detent ball (7137); the front stabilizing frame suspension detent shaft (7135) provides shock absorber action by means of a the front stabilizing frame suspension spring (7127) comprising a spring, pneumatic or hydraulic cylinder; where the front stabilizing frame suspension spring (7127) is a spring said spring has a front stabilizing frame suspension spring first end (7126) and a front stabilizing frame suspension spring second end (7128); the front stabilizing frame suspension spring second end (7128) is immovably affixed by immovable spring affixing means including welding, screws to the front stabilizing frame (7100); the front stabilizing frame suspension spring first end (7126) is immovably affixed by immovable spring affixing means including welding, screws within the front stabilizing frame suspension (7125); the front stabilizing frame suspension shaft (7129) is by the front stabilizing frame suspension spring (7127); the front stabilizing frame suspension shaft (7129) has a front stabilizing frame suspension shaft frame end (7130) which is immovably affixed by immovable shaft affixing means including welding and riveting to the front stabilizing frame (7100) thereby allowing the front stabilizing frame (7100) to yield and resist, by the spring function, variations in the terrain traversed by the wheel chair; when the front stabilizing frame suspension spring (7127) is comprised of a pneumatic or hydraulic cylinder with shaft the shaft will be affixed by immovable means including welding, riveting and other to the front stabilizing frame (7100) and the cylinder will be affixed to the frame;

p) when the front stabilizing frame (7100) and the at least one front stabilizing frame bearing and bushing (7120) is extending from the wheelchair front (3), there is at least one front stabilizing frame sleeve (7101) at the right side (8) and at the left side (9) each generally tubular and sized to receive the main frame member (200) extending outwardly and toward the wheelchair front (3); the least one front stabilizing frame sleeve (7101) at the right side (8) rigidly and tubularly interconnected with a generally cylindrical tubular front stabilizing frame transverse sleeve (7102) which is substantially orthogonal to the main frame member (200) at the right side (8); the least one front stabilizing frame sleeve (7101) at the left side (9) is rigidly and tubularly interconnected with a generally cylindrical tubular front stabilizing frame transverse sleeve (7102) which is substantially orthogonal to the main frame member (200) at the left side (9); the tubularly interconnection between the at least one front stabilizing frame sleeve (7101) and the front stabilizing frame transverse sleeve (7102) is offset upwardly from the main frame member (200) to allow access to the front stabilizing frame (7100) when existing at the right side (8) and at the left side (9); a front stabilizing frame front transverse frame member (7103) generally orthogonal to the main frame member (200) is generally cylindrical providing an axle function and is sized to be rotatably received at the right side (8) and at the left side (9) by respective front stabilizing frame transverse sleeve (7102); at least one front stabilizing frame bracket transverse bracket (7104) at the right side (8) and at the left side (9) comprising a bracket function for rigid and immovable attachment to the respective main frame member (200) and interconnected at the respective main frame member (200) by bolt or equivalent means for quick and easy installation and removal; an upwardly extending transverse sleeve from the at least one front stabilizing frame bracket transverse bracket (7104) oriented and aligned to rotatably receive the front stabilizing frame front transverse frame member (7103); at least one front stabilizing shock absorber (7105) comprised of a spring, pneumatic or hydraulic cylinder with shaft; at least one front stabilizing shock absorber front anchor (7106) upwardly extending and permanently and rigidly affixed to the front stabilizing frame front transverse frame member (7103); at least one front stabilizing shock absorber rear anchor (7107) permanently and rigidly affixed to the front stabilizing frame rear transverse frame member (7108); the rear transverse frame member (7108) generally comprising a main frame member (200) parallel with the front stabilizing frame front transverse frame member (7103); the at least one front stabilizing shock absorber (7105) movably and rotatably affixed to and between the at least one front stabilizing shock absorber front anchor (7106) and the at least one front stabilizing shock absorber rear anchor (7107) to function to absorb frame and wheel impacts; each of the at least one front stabilizing frame sleeve (7101), at the right side (8) and at the left side (9) receiving a the front stabilizing frame (7100) member; a front stabilizing frame sleeve aperture and bolt/nut (7109) penetrating the front stabilizing frame sleeve (7101) and the front stabilizing frame (7100) member to fixedly retain the front stabilizing frame (7100) during wheelchair use and to allow ease of assembly and disassembly;

q) the stabilizing wheel (7200) is ellipsoidal, spheroidal, or spherical having a major and minor axis or a diameter; the stabilizing wheel (7200) has a stabilizing wheel ridge (7240) protruding from the stabilizing wheel (7200) at the circumference of the stabilizing wheel (7200) orthogonal to the surface of travel; the stabilizing wheel ridge (7240) is convex.

2. An improved Off-Road Wheelchair comprising:
a) a wheelchair (1) having a front (3), a rear (7), a right side (8) and a left side (9) and a generally tubular main frame (200); a detachable wheel with disc brake unit (1000) having an elongated tubular hub (1100) with a hub axle aperture (1105) affixed by a hub mount bracket (1200), at one or both of the right side (8) and at the left side (9);
b) a generally planar disc shaped wheel mount plate (3000) having a wheel mount plate front (3200), a wheel mount plate rear (3400), at least one elongated and cylindrical wheel mount plate key (3600) extending outwardly from the wheel mount plate front (3200);
c) the at least one wheel mount plate key (3600) formed and sized to be slidably and securely received, at the wheel mount plate key insertion end (3620) by the at least one hub wheel mount plate wheel aperture (2600); the at least one wheel mount plate key (3600) having a wheel mount plate key insertion end (3620) distal from the wheel mount plate front (3200) and a wheel mount plate key attachment end (3640) proximal the wheel mount plate front (3200);
d) the wheel mount plate (3000) having a centrally positioned wheel mount plate axle aperture (3800) from the wheel mount plate front (3200) to the wheel mount plate rear (3400); the wheel mount plate (3000) at the wheel mount plate rear (3400) having at least one wheel mount plate spoke slot (3900) radiating outwardly from the plate axle aperture (3800); an axle housing (4300) aligned with the wheel mount plate rear (3400); at least one axle spoke aperture (4310) at the axle housing (4300); the at least one wheel mount plate spoke slot (3900) and the at least one axle spoke aperture (4310)

securely receiving bicycle spokes (3960) extending from a wheel rim (3980) in a bicycle spoke (3960) weave;

e) an elongated and generally tubular and cylindrical axle (4000) rotatably received and secured at the axle housing (4300) at an axle hub insertion end (4100) and through the axle housing (4300) through the wheel mount plate rear (3400) toward the wheel mount plate front (3200);

f) a brake rotor (5000) having at least one brake rotor mounting aperture (5020) and a brake rotor wheel mount aperture (5040) centrally positioned at the brake rotor (5000); a caliper (5100) immovably affixed by a hub mount bracket (1200) to the wheelchair (1) and positioned to be engagingly received by the brake rotor (5000) upon operation of a closing means including a lever actuated cable;

g) an anti-wheelie wheel unit (6000) having an anti-wheelie wheel unit frame (6100); the anti-wheelie wheel unit frame (6100) has a unit frame first end (6105) and a unit frame second end (6110); a generally U shaped anti-wheelie wheel frame (6140) affixed by frame affixing means at the unit frame first end (6105);

h) an anti-wheelie wheel attachment bracket (6240) having an anti-wheelie wheel attachment bracket frame clamp (6250) immovably clamped at a transverse wheelchair rear upper frame (6300) and at a transverse wheelchair rear lower frame (6320); the anti-wheelie wheel attachment bracket (6240) extending a generally U shaped anti-wheelie adjustment bar frame (6260) outwardly from the upper frame (6300) and from the lower frame (6320); an anti-wheelie adjustment aperture (6226) at the unit frame second end (6110) is received and is pivotally affixed by an anti-wheelie adjustment bar frame axle (6280), comprised generally a bolt and nut, at the generally U shaped anti-wheelie adjustment bar frame (6260) at the lower frame (6320);

i) an anti-wheelie wheel frame position adjustment frame (6200) formed integral with the anti-wheelie wheel unit frame (6100) or alternatively extending outwardly from the anti-wheelie wheel unit frame (6100); the adjustment frame (6200) having an anti-wheelie wheel frame position adjustment top (6211); the adjustment frame (6200) having an elongated anti-wheelie wheel frame position adjustment slot (6210) formed therein; at least one anti-wheelie wheel frame position adjustment aperture (6212) formed in the adjustment frame (6200) intermediate the adjustment top (6211) and the adjustment slot (6210);

j) an elongated tubular or generally planar anti-wheelie adjustment bar (6220) having an anti-wheelie adjustment bar first end (6222), an anti-wheelie adjustment bar second end (6224); an anti-wheelie adjustment aperture (6226) proximal the anti-wheelie adjustment bar first end (6222) and proximal the anti-wheelie adjustment bar second end (6224);

k) an anti-wheelie wheel frame position adjustment device (6213) securing the anti-wheelie wheel frame position adjustment frame (6200) in a pre-selected position;

l) the anti-wheelie adjustment bar second end (6224) and anti-wheelie adjustment aperture (6226) is received and is pivotally affixed by an anti-wheelie adjustment bar frame axle (6280), at the generally U shaped anti-wheelie adjustment bar frame (6260) at the upper frame (6300);

m) a stabilizing wheel unit (7000) at the wheelchair front (3); at least one front stabilizing frame bearing and bushing (7120) at the right side (8) and left side (9) or in front (3); the at least one front stabilizing frame bearing and bushing(7120) is immovably affixed to the wheel chair (1), receives either a standard wheel(7210) or a stabilizing wheel (7200) which is supported and secured by a generally U or V shaped pivoting front stabilizing frame (7100); the stabilizing frame (7100) is downwardly extending rotatably affixed by a wheel axle and bearing (7220) to at least one standard wheel (7210) or at least one stabilizing wheel (7200); the downwardly extending stabilizing frame (7100) forms an acute angle (7225) relative to a downwardly extending perpendicular from the main frame (200) and the wheel axle and bearing (7220); the at least one front stabilizing frame bearing and bushing(7120) at the right side (8) and left side (9) or in front (3) providing an independent suspension comprising a front stabilizing frame suspension (7125); the front stabilizing frame suspension (7125) is tubular generally comprising a cylinder which is sized to receive, in ordinary use, an elongated rigid front stabilizing frame suspension detent shaft (7135) extending from a standard wheelchair wheel (7210) having a yoke and axle; the front stabilizing frame suspension detent shaft (7135) having a front stabilizing frame bearing and bushing ball aperture (7122) sized to permit a spring front stabilizing frame suspension detent ball (7137) to extend therefrom when the front stabilizing frame suspension detent shaft (7135) is inserted into the cylinder and through a cylinder aperture distal to the yoke; the cylinder aperture sized to retain the suspension detent shaft (7135) by release of the spring front stabilizing frame suspension detent ball (7137); off road wheelchair use is enabled when the standard wheel (7210) is released from the cylinder and replaced with a stabilizing wheel (7200) having a front stabilizing frame suspension detent shaft (7135) secured by a spring front stabilizing frame suspension detent ball (7137); the front stabilizing frame suspension detent shaft (7135) provides shock absorber action by means of a the front stabilizing frame suspension spring (7127) comprising a spring, pneumatic or hydraulic cylinder; where the front stabilizing frame suspension spring (7127) is a spring said spring has a front stabilizing frame suspension spring first end (7126) and a front stabilizing frame suspension spring second end (7128); the front stabilizing frame suspension spring second end (7128) is immovably affixed by immovable spring affixing means including welding, screws to the front stabilizing frame (7100); the front stabilizing frame suspension spring first end (7126) is immovably affixed by immovable spring affixing means including welding, screws within the front stabilizing frame suspension (7125); the front stabilizing frame suspension shaft (7129) is by the front stabilizing frame suspension spring (7127); the front stabilizing frame suspension shaft (7129) has a front stabilizing frame suspension shaft frame end (7130) which is immovably affixed by immovable shaft affixing means including welding and riveting to the front stabilizing frame (7100) thereby allowing the front stabilizing frame (7100) to yield and resist, by the spring function, variations in the terrain traversed by the wheel chair; when the front stabilizing frame suspension spring (7127) is comprised of a pneumatic or hydraulic cylinder with shaft the shaft will be affixed by immovable means including welding, riveting and other to the front stabilizing frame (7100) and the cylinder will be affixed to the frame;

n) when the front stabilizing frame (7100) and the at least one front stabilizing frame bearing and bushing (7120) is extending outwardly from the wheelchair front (3), there is at least one front stabilizing frame sleeve (7101) at the right side (8) and at the left side (9) each generally tubular and sized to receive the main frame member (200) extending outwardly and toward the wheelchair front (3); the least one front stabilizing frame sleeve (7101) at the right side (8) rigidly and tubularly interconnected with a generally cylindrical tubular front stabilizing frame transverse sleeve (7102) which is substantially orthogonal to the main frame member (200) at the right side (8); the least one front stabilizing frame sleeve (7101) at the left side (9) is rigidly and tubularly interconnected with a generally cylindrical tubular front stabilizing frame transverse sleeve (7102) which is substantially orthogonal to the main frame member (200) at the left side (9); the tubularly interconnection between the at least one front stabilizing frame sleeve (7101) and the front stabilizing frame transverse sleeve (7102) is offset upwardly from the main frame member (200) to allow access to the front stabilizing frame (7100) when existing at the right side (8) and at the left side (9); a front stabilizing frame front transverse frame member (7103) generally orthogonal to the main frame member (200) is generally cylindrical providing an axle function and is sized to be rotatably received at the right side (8) and at the left side (9) by respective front stabilizing frame transverse sleeve (7102); at least one front stabilizing frame bracket transverse bracket (7104) at the right side (8) and at the left side (9) comprising a bracket function for rigid and immovable attachment to the respective main frame member (200) and interconnected at the respective main frame member (200) by bolt or equivalent means for quick and easy installation and removal; an upwardly extending transverse sleeve from the at least one front stabilizing frame bracket transverse bracket (7104) oriented and aligned to rotatably receive the front stabilizing frame front transverse frame member (7103); at least one front stabilizing shock absorber (7105) comprised of a spring, pneumatic or hydraulic cylinder with shaft; at least one front stabilizing shock absorber front anchor (7106) upwardly extending and permanently and rigidly affixed to the front stabilizing frame front transverse frame member (7103); at least one front stabilizing shock absorber rear anchor (7107) permanently and rigidly affixed to the front stabilizing frame rear transverse frame member (7108); the rear transverse frame member (7108) generally comprising a main frame member (200) parallel with the front stabilizing frame front transverse frame member (7103); the at least one front stabilizing shock absorber (7105) movably and rotatably affixed to and between the at least one front stabilizing shock absorber front anchor (7106) and the at least one front stabilizing shock absorber rear anchor (7107) to function to absorb frame and wheel impacts; each of the at least one front stabilizing frame sleeve (7101), at the right side (8) and at the left side (9) receiving a the front stabilizing frame (7100) member; a front stabilizing frame sleeve aperture and bolt/nut (7109) penetrating the front stabilizing frame sleeve (7101) and the front stabilizing frame (7100) member to fixedly retain the front stabilizing frame (7100) during wheelchair use and to allow ease of assembly and disassembly.

3. The improved Off-road Wheelchair of claim 2, further comprising:

a) the detachable wheel with disc brake unit (1000) having a generally planar and disc shaped hub wheel mount plate (2000) having a hub wheel mount plate front (2200), a hub wheel mount plate rear (2400) and a centrally positioned hub axle aperture (1120); the hub (1100) is friction received by the wheel mount plate (2000) at the mount plate rear (2400); a generally disc shaped hub to hub wheel mount plate connector (1140) is immovably affixed to the hub (1100) and is in surface contact with the mount plate rear (2400) when the hub (1100) is received by the mount plate rear (2400);

b) the wheel mount plate key attachment end (3640) immovably affixed at the wheel mount plate (3000) by immovable affixing means (3650) including welding, thread, by being received by a wheel mount plate key aperture (3660) and being secured by rivet, screw or welding;

c) the at least one hub wheel mount plate wheel aperture (2600) shaped to securely receive the at least one wheel mount plate key (3600);

d) the at least one wheel mount plate spoke slot (3900) radiating outwardly from the plate axle aperture (3800) is sized and shaped to securely receive a bicycle spoke in at least one bicycle spoke weave patterns;

e) the bicycle spokes (3960) immovably affixed at the wheel mount plate rear (3400) by at least one immovable disc or washer shaped wheel mount plate spoke retainer (3920) secured by welding, thread, by being received by a wheel mount plate key aperture (3660) and being secured by rivet, screw or welding;

f) the axle (4000) secured in the axle housing (4300) by an axle detent (4200) proximal the axle hub insertion end (4100) and an axle detent actuator (4220) distal to the axle hub insertion end (4100);

g) the at least one brake rotor mounting aperture (5020) aligned with the at least one hub wheel mount rotor aperture (2800);

h) the anti-wheelie wheel unit (6000) having an elongated tubular or bar constructed anti-wheelie wheel unit frame (6100);

i) the anti-wheelie wheel frame (6140) either affixed at the unit frame first end (6105) by immovable affixing means of welding or riveting or the generally U shaped anti-wheelie wheel frame (6140) having an elongated anti-wheelie wheel frame connecting member (6145) extending rearwardly toward the unit frame first end (6105) and received into the wheel unit frame (6100) or receiving the wheel unit frame (6100) at the unit frame first end (6105) with at least one anti-wheelie wheel frame connecting member aperture (6147) at the frame connecting member (6145) aligned with and interconnected with at least one unit frame first end aperture (6107) proximal the unit frame first end (6105), with an anti-wheelie wheel frame connecting quick lock pin (6149);

j) the anti-wheelie wheel attachment bracket (6240) bolt and thread interconnected with the anti-wheelie wheel attachment bracket frame clamp (6250) allowing the interconnection to render immovable the attachment bracket (6240);

k) an anti-wheelie wheel frame position adjustment device (6213) comprising an anti-wheelie wheel frame position adjustment knob (6214) having an anti-wheelie wheel frame position adjustment bolt (6215) extending from the adjustment knob (6214) toward and through anti-wheelie adjustment aperture (6226) proximal the anti-wheelie adjustment bar first end (6222) and the anti-wheelie wheel frame position adjustment slot (6210) toward an anti-wheelie wheel frame position bracket (6216) and threadably received at a threaded anti-wheelie wheel frame position bracket aperture (6217) formed in the frame position bracket (6216);

l) the frame position bracket (6216) having an anti-wheelie wheel frame position bracket top (6218); at least one elongated cylindrical anti-wheelie wheel frame position bracket key (6219) extends outwardly from the anti-wheelie wheel frame position bracket (6216) and is positioned to be received by one of the at least one of the anti-wheelie wheel frame position adjustment apertures (6212); the position bracket top (6218) bent toward the anti-wheelie wheel frame position adjustment top (6211); the at least one frame position bracket key (6219) is received by one of the at least frame position adjustment apertures (6212) and the bent frame position bracket top (6218) is friction and contact received by the anti-wheelie wheel frame position adjustment top (6211) when the anti-wheelie wheel frame position adjustment knob (6214) is turned to tighten the anti-wheelie wheel frame position bracket (6216) against the anti-wheelie wheel frame position adjustment frame (6200);

m) the anti-wheelie adjustment bar frame axle (6280) is comprised generally of a bolt and nut;

n) the stabilizing frame (7100) is downwardly extending rotatably affixed by a wheel axle and bearing (7220) to at least one standard wheel (7210) or at least one stabilizing wheel (7200).

4. The improved Off-road wheelchair of claim 3, further comprising:
 a) the hub to hub wheel mount plate connector (1140) has at least one hub to hub wheel mount plate connector aperture (1145) aligned with at least one hub mounting aperture (1160) from the hub wheel mount plate front (2200) to the hub wheel mount plate rear (2400);
 b) the at least one brake rotor mounting aperture (5020) and the at least one hub wheel mount rotor aperture (2800) receiving immovable affixing means including screw and thread, bolt and rivet;
 c) the anti-wheelie wheel frame connecting quick lock pin (6149), comprising a quick lock or detent pen, to position an anti-wheelie wheel (6120) either downwardly extending for earth or surface contact or rotated 90° or 180° to be positioned to avoid contact with an individual pushing the wheel chair; the anti-wheelie wheel frame (6140) rotatably receives an anti-wheelie wheel (6120) by an anti-wheelie wheel axle (6160) comprised of nut and bolt;
 d) the downwardly extending stabilizing frame (7100) forms an acute angle relative to a downwardly extending perpendicular from the main frame (200);
 e) the stabilizing wheel (7200) is ellipsoidal, spheroidal, or spherical having a major and minor axis or a diameter.

5. The improved Off-road wheelchair of claim 4, further comprising:
 a) the hub wheel mount plate (2000) is securely and immovably affixed to the hub to hub wheel mount plate connector (1140) by screw or bolt and thread;
 b) at least one axle spacer (4320) intermediate the wheel mount plate front (3200) and the axle detent actuator (4220);
 c) the stabilizing wheel (7200) has a stabilizing wheel ridge (7240) protruding from the stabilizing wheel (7200) at the circumference of the stabilizing wheel (7200) orthogonal to the surface of travel.

6. The improved Off-road wheelchair of claim 5, further comprising:
 a) at least one hub wheel mount plate wheel aperture (2600) having a hub wheel mount plate wheel aperture chamfer (2620) proximal the plate front (2200);
 b) the at least one wheel mount plate key (3600) chamfered at the wheel mount plate key attachment end (3640) proximal the wheel mount plate front (3200);
 c) the stabilizing wheel ridge (7240) is convex.

\* \* \* \* \*